United States Patent
Hwang et al.

(10) Patent No.: US 11,582,012 B2
(45) Date of Patent: Feb. 14, 2023

(54) METHOD AND DEVICE FOR SETTING RESOURCE POOL IN NR V2X

(71) Applicant: LG Electronics Inc., Seoul (KR)

(72) Inventors: Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/705,222

(22) Filed: Mar. 25, 2022

(65) Prior Publication Data

US 2022/0216977 A1 Jul. 7, 2022

Related U.S. Application Data

(63) Continuation of application No. PCT/KR2021/001266, filed on Feb. 1, 2021.

(60) Provisional application No. 63/016,963, filed on Apr. 28, 2020.

(30) Foreign Application Priority Data

| Feb. 12, 2020 | (KR) | ......................... | 10-2020-0016953 |
| Mar. 18, 2020 | (KR) | ......................... | 10-2020-0033198 |
| Apr. 9, 2020  | (KR) | ......................... | 10-2020-0043123 |

(51) Int. Cl.
*H04W 4/00* (2018.01)
*H04L 5/00* (2006.01)
*H04L 5/14* (2006.01)

(52) U.S. Cl.
CPC .......... *H04L 5/0092* (2013.01); *H04L 5/0048* (2013.01); *H04L 5/1461* (2013.01)

(58) Field of Classification Search
CPC .... H04L 5/0092; H04L 5/0048; H04L 5/1461
USPC ......................................................... 370/278
See application file for complete search history.

(56) References Cited

U.S. PATENT DOCUMENTS

| 2018/0098322 A1 | 4/2018 | Yoon |
| 2020/0045697 A1 | 2/2020 | Choi |

FOREIGN PATENT DOCUMENTS

| WO | WO2018193 676 | 10/2018 |
| WO | WO2019064466 | 4/2019 |
| WO | WO-2021027855 A1 * | 2/2021 |

OTHER PUBLICATIONS

Nokia, Nokia Shanghai Bell (Discussion of physical layer structure for sidelink R1-1911952, Reno, U.S., Nov. 18-22, 2019) (Year: 2019).*
NEC (R1-1912615, Physical layer structure for NR sidelink, Reno, USA, Nov. 18-22, 2019) (Year: 2019).*
ITL ("Physical layer structure for NR V2X", Reno, USA, Nov. 18-22, 2019, R1-1912370) (Year: 2019).*

(Continued)

*Primary Examiner* — Maharishi V Khirodhar
(74) *Attorney, Agent, or Firm* — Fish & Richardson P.C.

(57) ABSTRACT

A method for a first device to perform wireless communication and a device supporting same. The method may include the steps of: receiving, from a base station, a time division duplex uplink-downlink (TDD UL-DL) configuration including information related to a UL resource; receiving, from the base station, information related to the start of sidelink (SL) symbols, information related to the number of the SL symbols, and a bitmap indicating one or more slots included in an SL resource pool; and determining the SL resource pool.

20 Claims, 25 Drawing Sheets

(56) References Cited

OTHER PUBLICATIONS

Huawei(R1-1911882, Sidelink physical layer structure for NRV2X, Reno, USA, Nov. 18-22, 2019). (Year: 2019).*
3GPP, "3rd Generation Partnership Project; Technical Specification Group Radio Access Network; NR; Physical layer procedures for control (Release 15)," TS 38.213 V15.8.0, Dec. 2019, 109 pages.
3GPP, "3rd Generation Partnership Project; Technical Specification Group Radio Access Network; NR; Radio Resource Control (RRC) protocol specification (Release 15)," TS 38.331 V15.8.0, Dec. 2019, 316 pages.
Huawei & HiSilicon, "Sidelink physical layer structure for NR V2X," R1-1911882, Presented at 3GPP TSG RAN WG1 Meeting #99, Reno, USA, Nov. 18-22, 2019, 35 pages.
ITL, "Physical layer structure for NR V2," R1-1912370, Presented at 3GPP TSG RAN WG1 #99, Reno, USA, Nov. 18-22, 2019, 7 pages.
Spreadtrum Communications, "Discussion on physical layer structure for sidelink," R1-1912575, Presented at 3GPP TSG RAN WG1 #99, Reno, USA, Nov. 18-22, 2019, 12 pages.
ZTE & Sanechips, "NR sidelink physical layer structure," R1-1912514, Presented at 3GPP TSG RAN WG1 #99, Reno, USA, Nov. 18-22, 2019, 12 pages.
Extended European Search Report in European Appln. No. 21754480.8, dated Sep. 23, 2022, 15 pages.
Intel Corporation, "Summary#4 for A17.2.4.2.2 Mode-2 Resource Allocation," R1-1913569, Presented at 3GPP TSG RAN WG1 Meeting #99, Reno, Nevada, USA, Nov. 18-22, 2019, 46 pages.
Oppo, "Discussions on resource reservation, sensing and selection in Mode 2," R1-1910379, Presented at 3GPP TSG-RAN WG1 Meeting #98bis, Chongqing, China, Oct. 14-20, 2019, 11 pages.
Vivo, "Discussion on mode 1 resource allocation mechanism," R1-1908149, Presented at 3GPP TSG RAN WG1 #98, Prague, CZ, Aug. 26-30, 2019, 15 pages.

* cited by examiner

FIG. 4
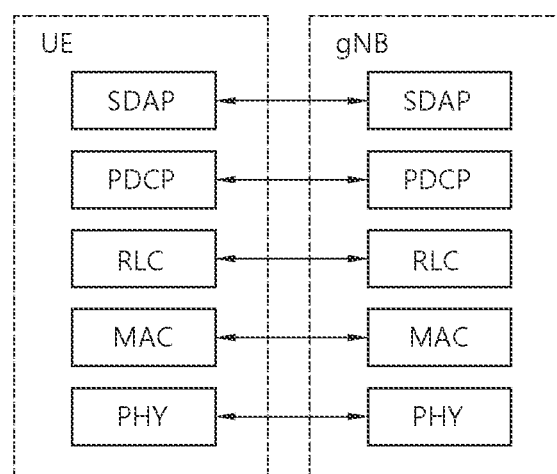
(a)
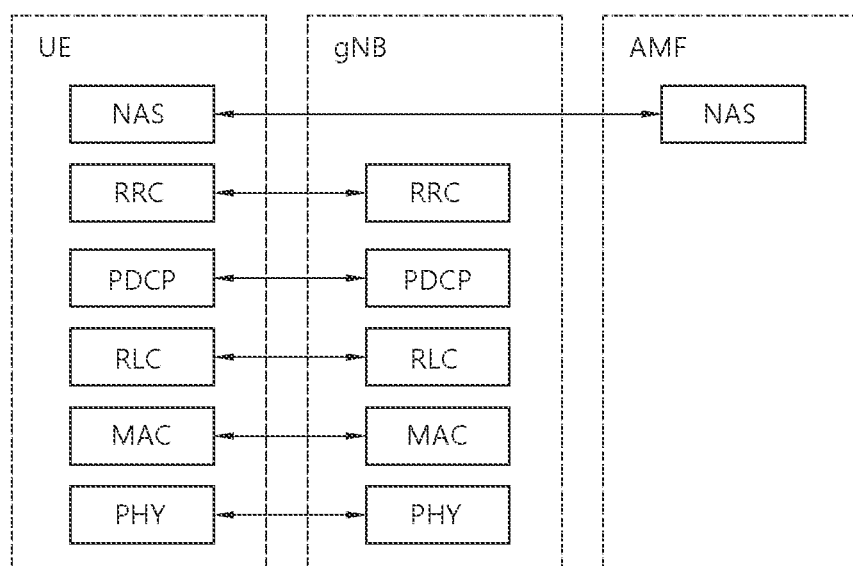
(b)

FIG. 8
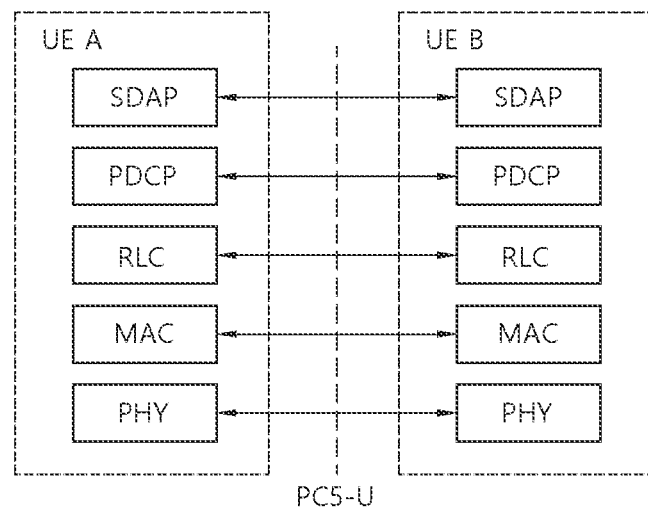
(a)
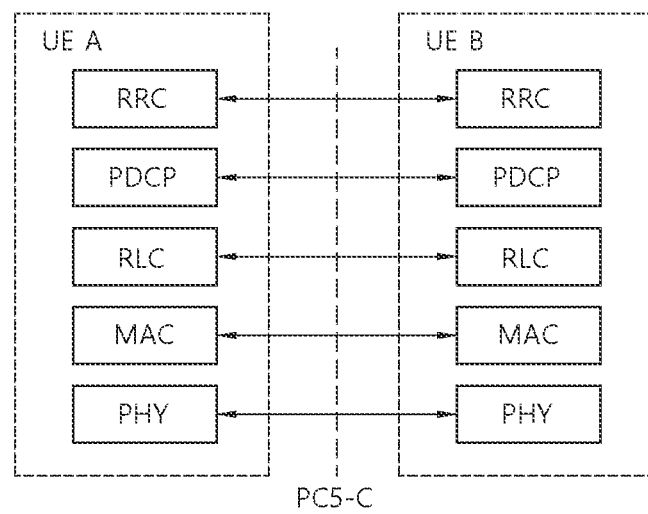
(b)

METHOD AND DEVICE FOR SETTING RESOURCE POOL IN NR V2X

CROSS-REFERENCE TO RELATED APPLICATIONS

Pursuant to 35 U.S.C. § 119(e), this application is a continuation of International Application No. PCT/KR2021/001266, with an international filing date of Feb. 1, 2021, which claims the benefit of Korean Patent Application No. 10-2020-0016953, filed on Feb. 12, 2020, Korean Patent Application No. 10-2020-0033198, filed on Mar. 18, 2020, Korean Patent Application No. 10-2020-0043123, filed on Apr. 9, 2020, and U.S. Provisional Patent Application No. 63/016,963, filed on Apr. 28, 2020, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, if only some symbols among symbols in a slot are configured as UL, the UE needs to determine whether the corresponding slot can be used as a SL slot. Meanwhile, the UE may determine a TDD UL DL pattern indicated by the PSBCH based on a TDD UL DL pattern of Uu link. In this case, according to the limit of the PSBCH payload size and the accessible SCS information, a method in which the UE can efficiently indicate/represent the TDD pattern may be required.

Technical Solutions

In one embodiment, a method for performing, by a first device, wireless communication is provided. The method may comprise: receiving, from a base station, a time division duplex uplink-downlink (TDD UL-DL) configuration including information related to an uplink (UL) resource; receiving, from the base station, information related to a start of sidelink (SL) symbols, information related to a number of the SL symbols, and a bitmap representing one or more slots included in a SL resource pool; and determining the SL resource pool. A plurality of second slots may be determined by excluding one or more slots in which at least one symbol among the SL symbols is not configured as the UL resource from a plurality of first slots, and a plurality of third slots may be determined by excluding one or more slots in which a sidelink-synchronization signal block (S-SSB) is configured from the plurality of second slots, and a plurality of fourth slots may be determined by excluding one or more reserved slots from the plurality of third slots, and a plurality of fifth slots among the plurality of fourth slots may be determined as the SL resource pool based on the bitmap.

In one embodiment, a first device configured to perform wireless communication is provided. The first device may comprise: one or more memories storing instructions; one or more transceivers; and one or more processors connected to the one or more memories and the one or more transceivers. The one or more processors may execute the instructions to: receive, from a base station, a time division duplex uplink-downlink (TDD UL-DL) configuration including information related to an uplink (UL) resource; receive, from the base station, information related to a start of sidelink (SL) symbols, information related to a number of the SL symbols, and a bitmap representing one or more slots included in a SL resource pool; and determine the SL resource pool. A plurality of second slots may be determined by excluding one or more slots in which at least one symbol among the SL symbols is not configured as the UL resource from a plurality of first slots, and a plurality of third slots may be determined by excluding one or more slots in which a sidelink-synchronization signal block (S-SSB) is configured from the plurality of second slots, and a plurality of fourth slots may be determined by excluding one or more reserved slots from the plurality of third slots, and a plurality of fifth slots among the plurality of fourth slots may be determined as the SL resource pool based on the bitmap.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
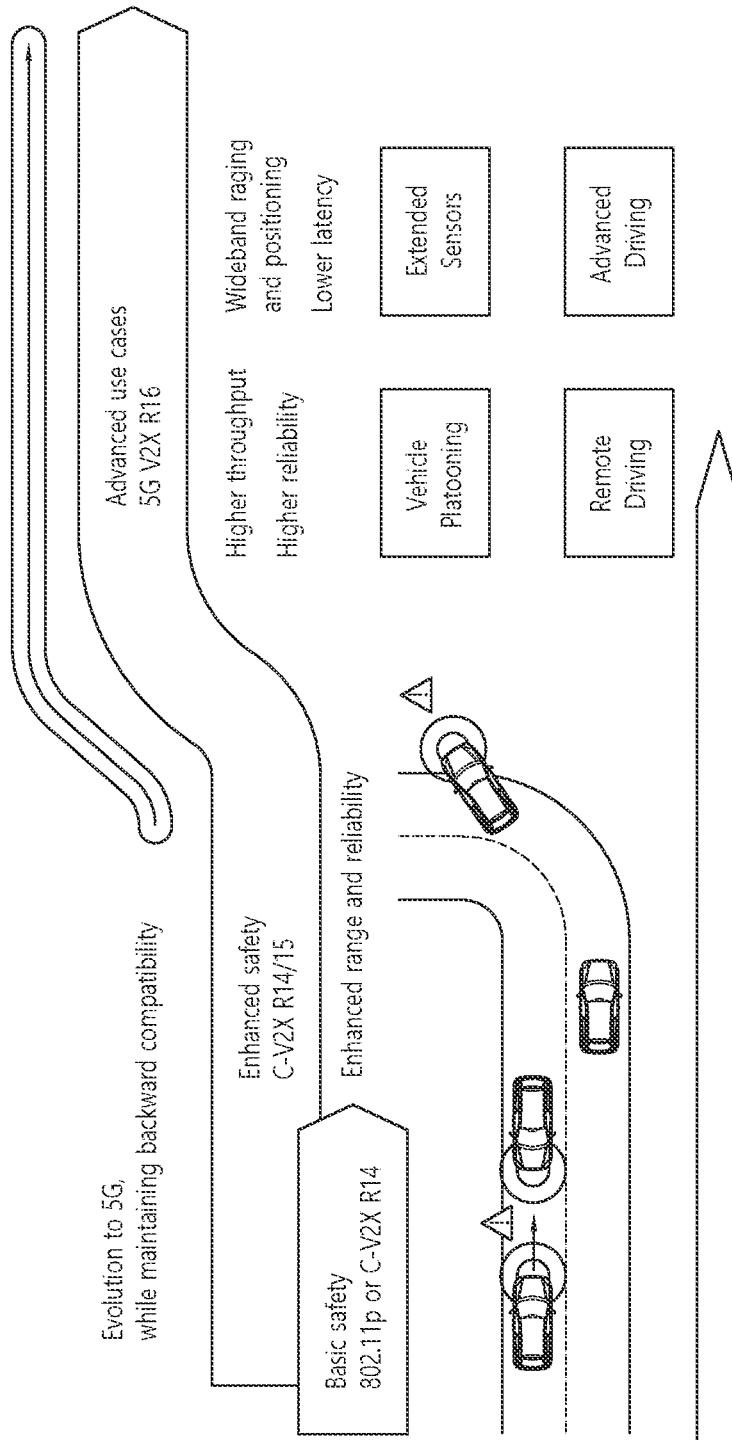
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
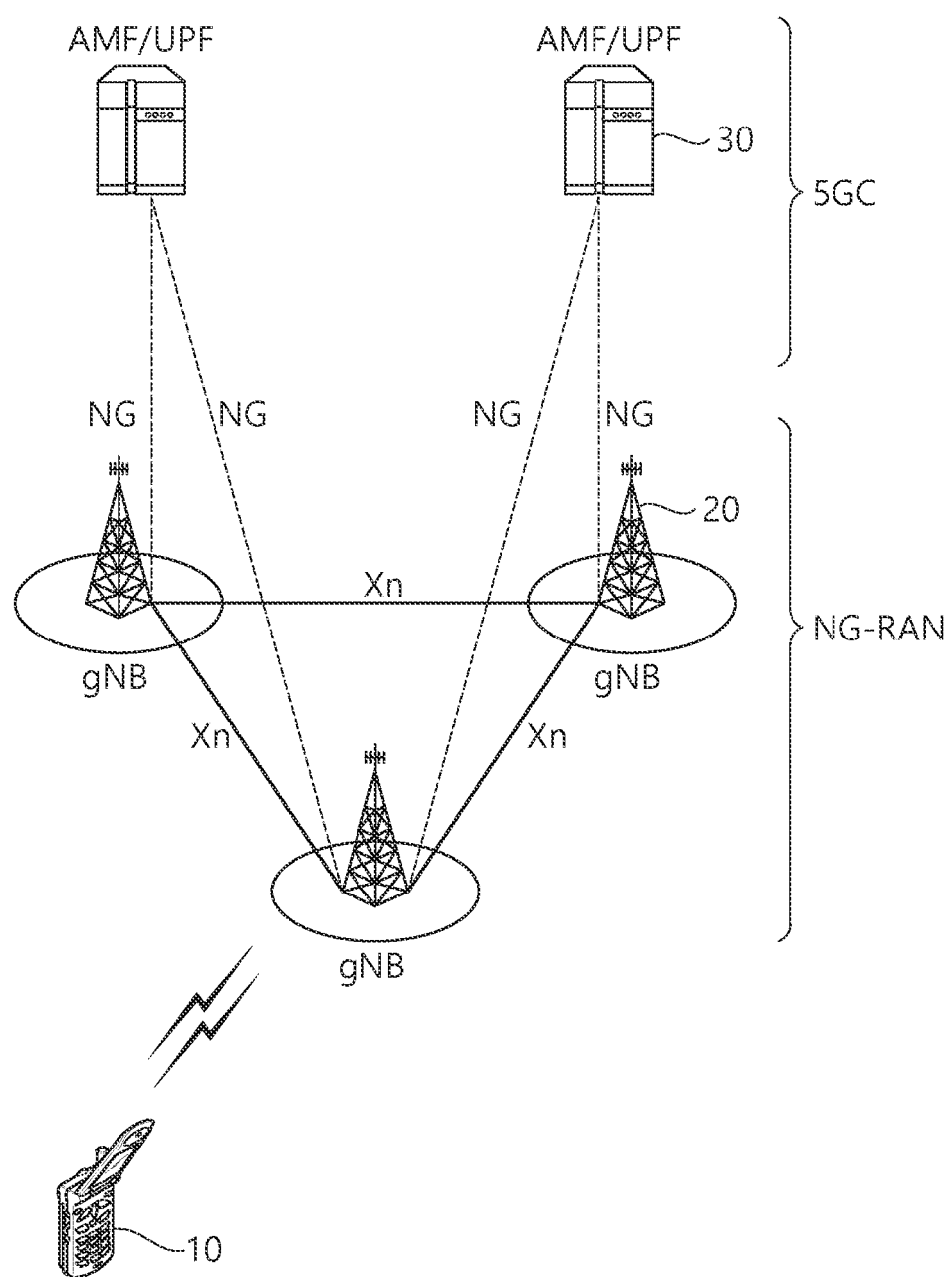
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
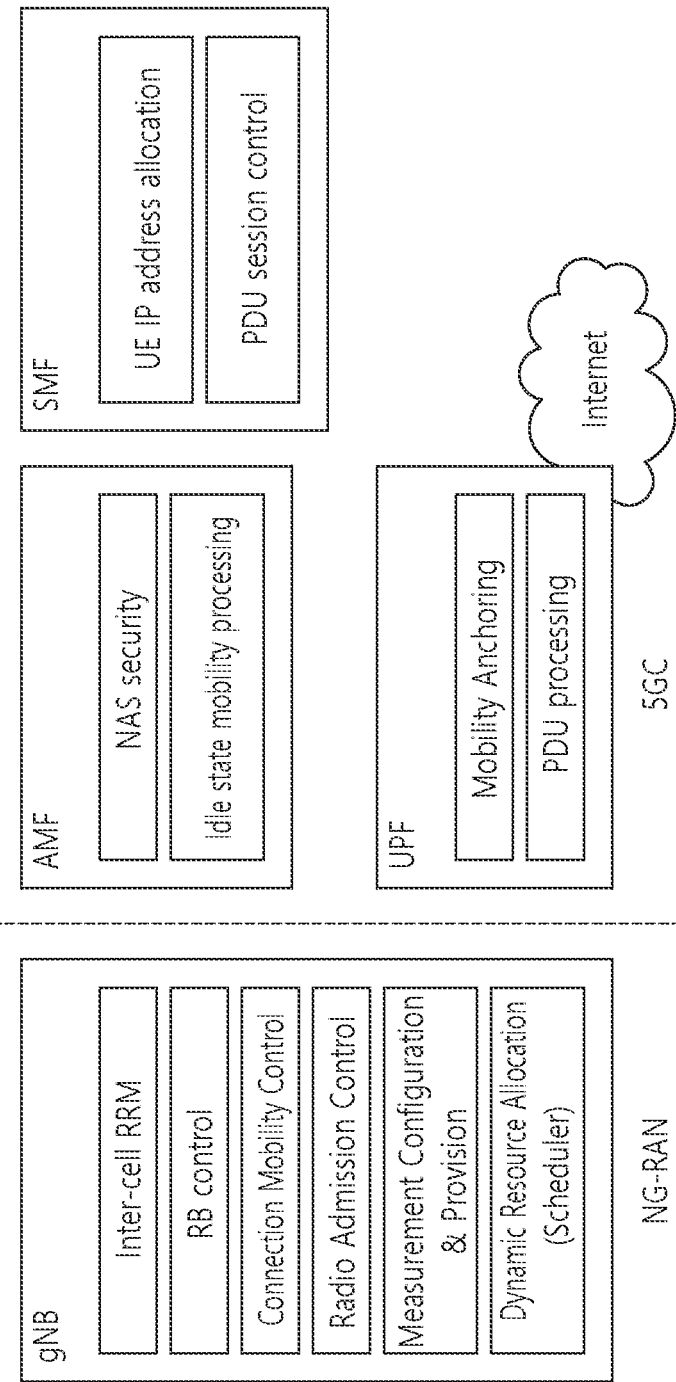
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
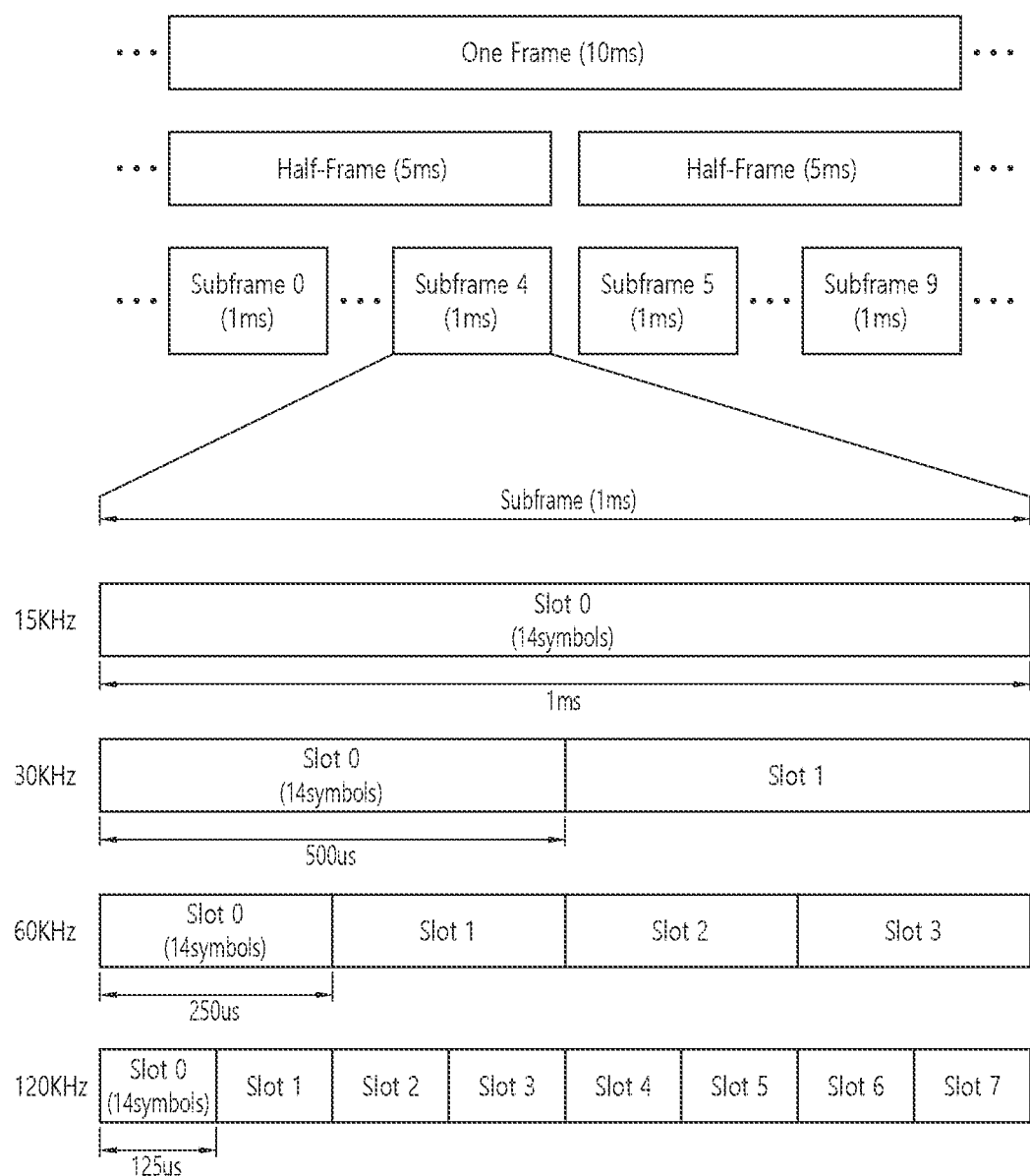
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
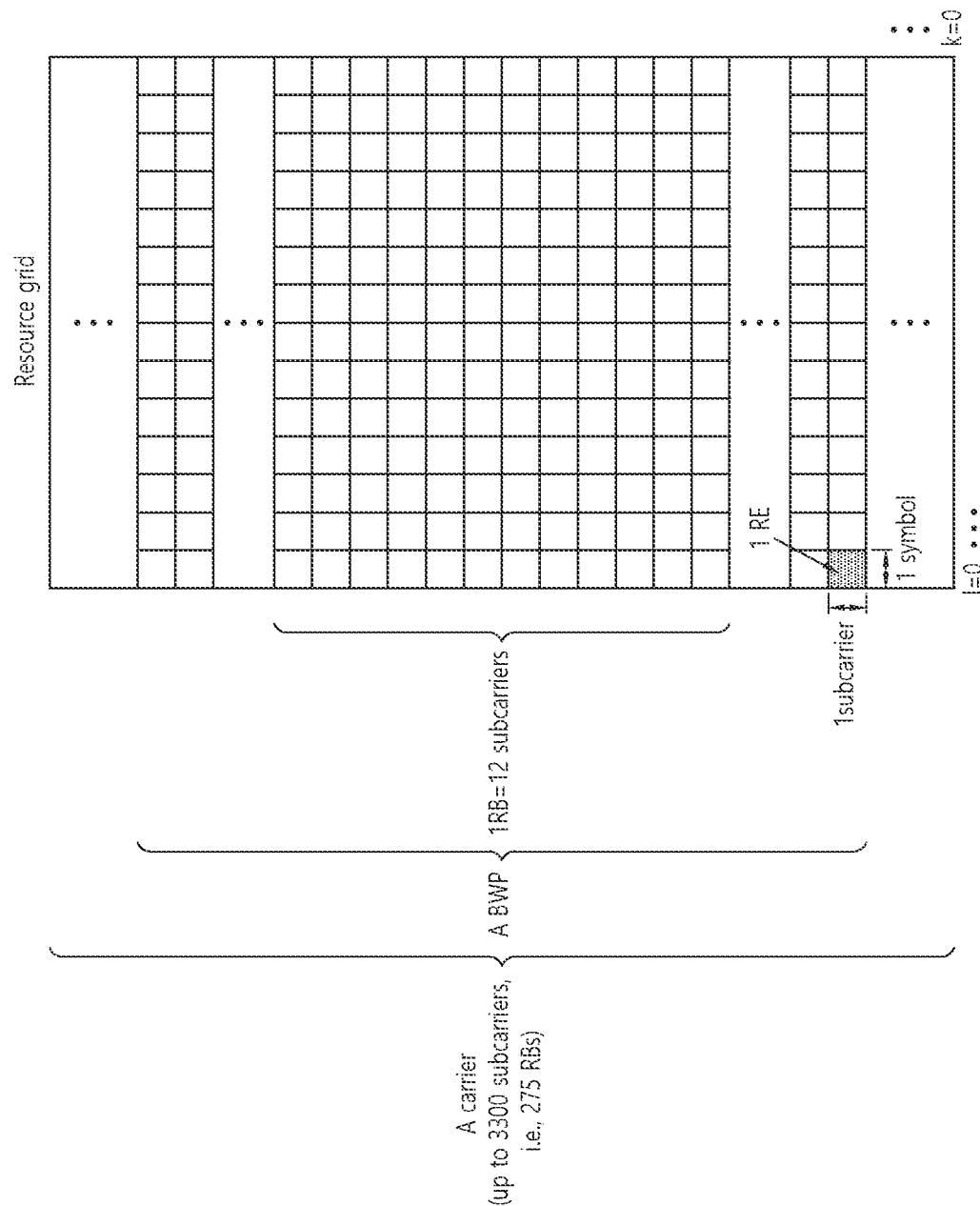
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
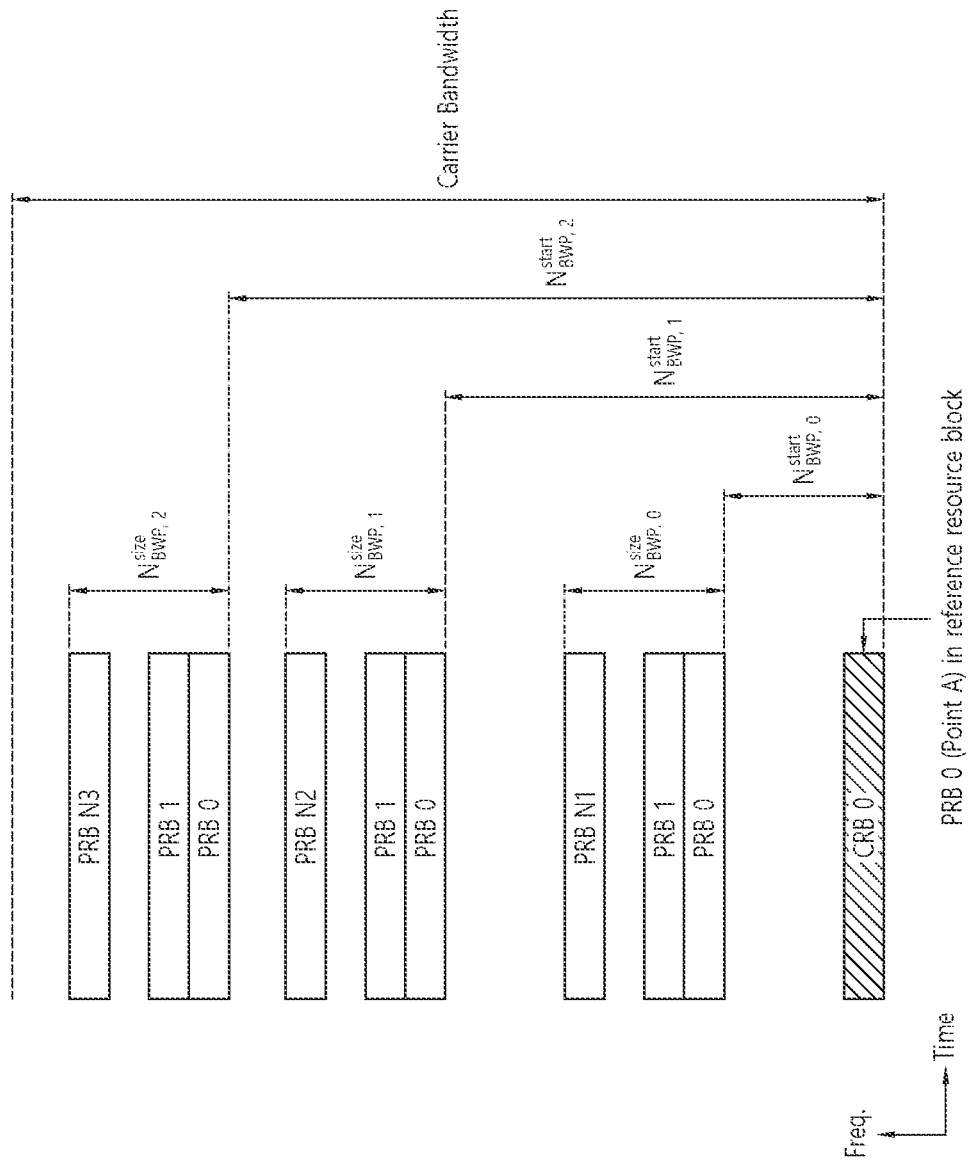
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
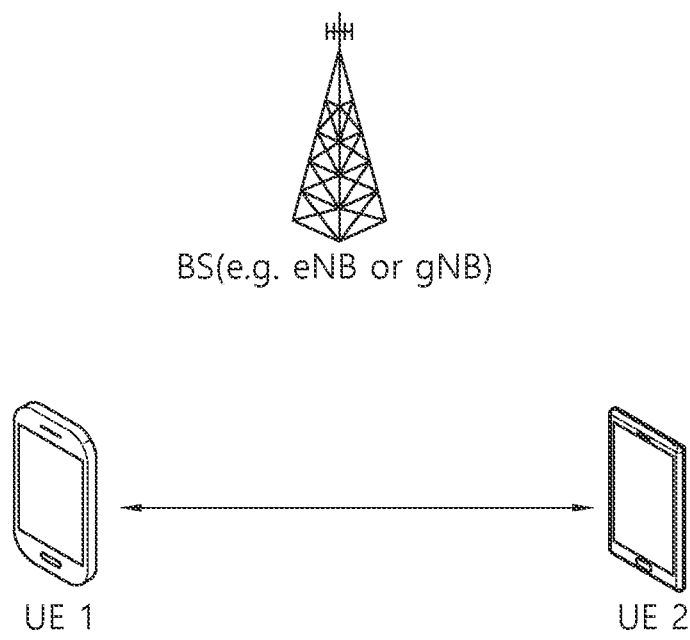
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
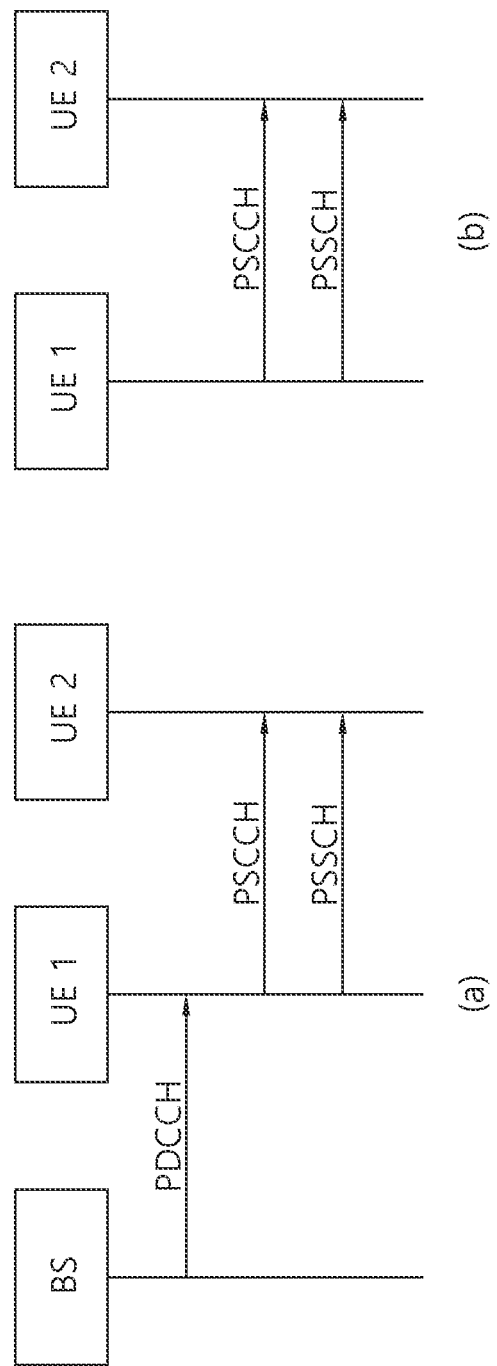
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
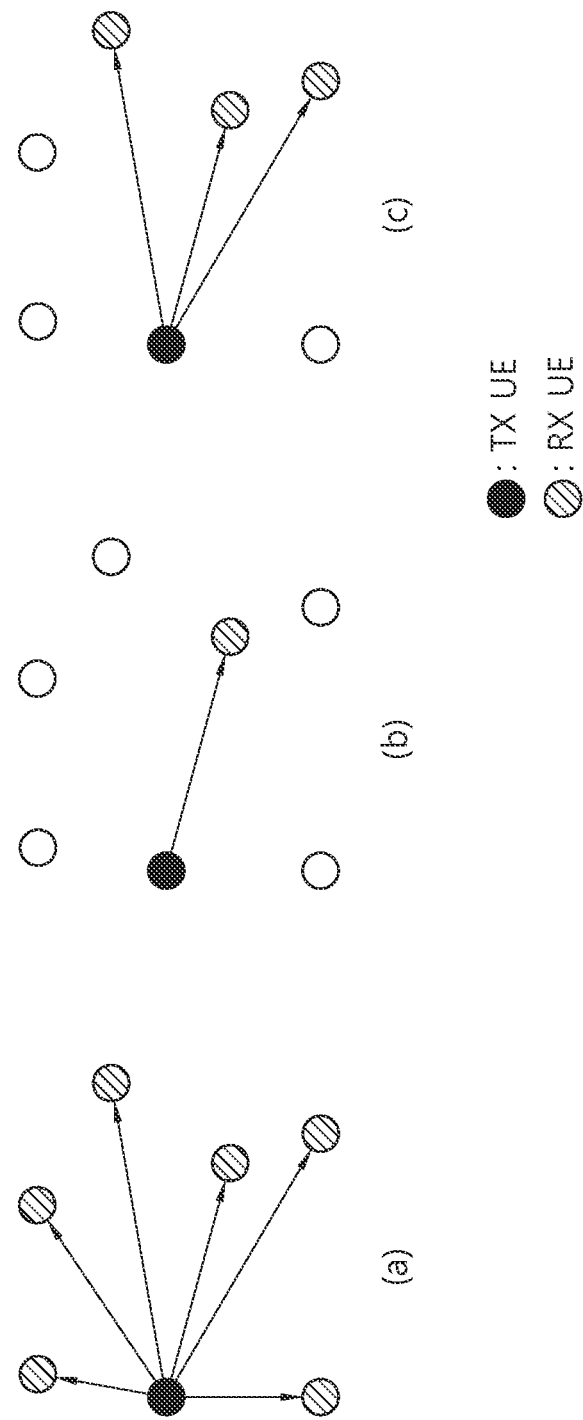
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Figure 12:
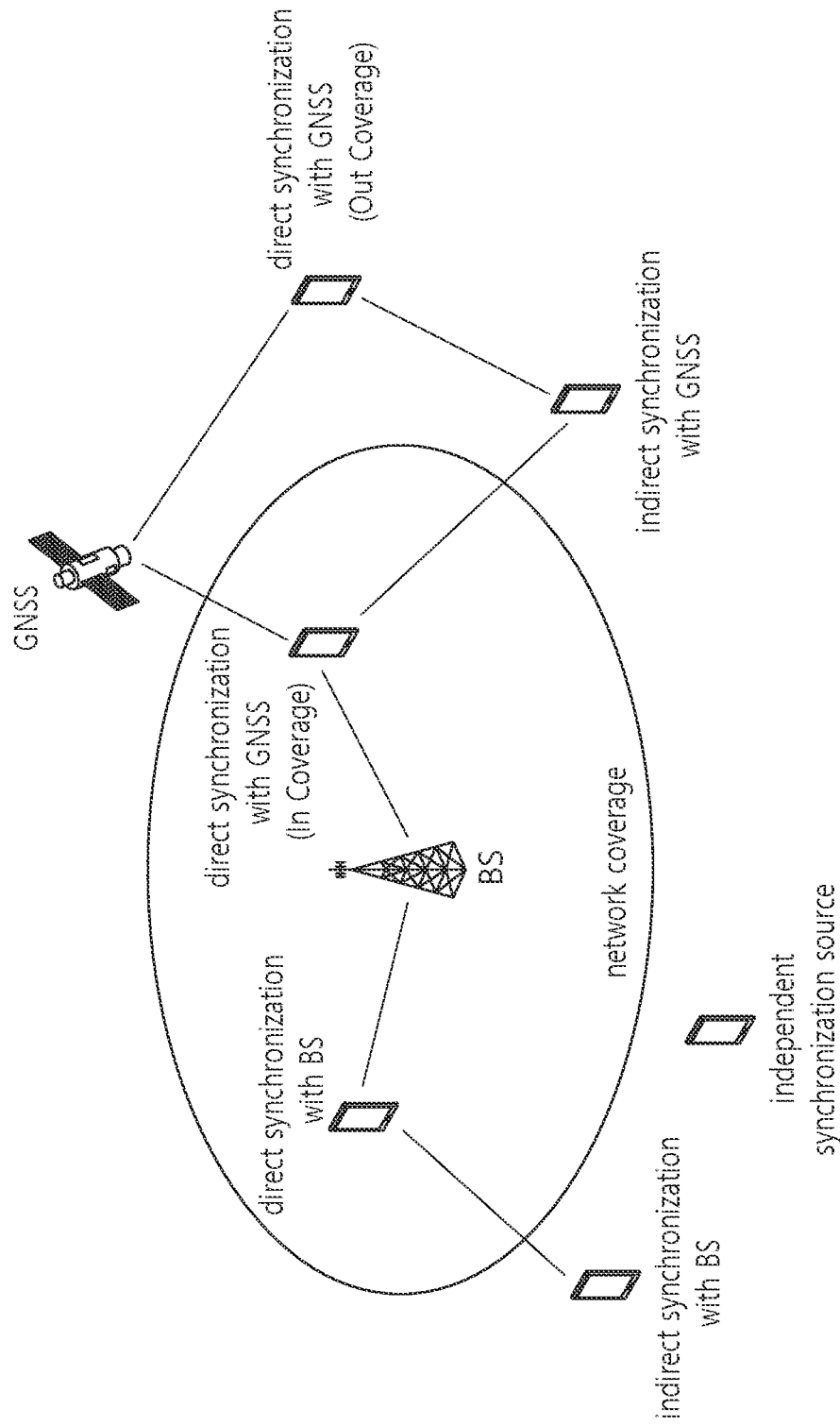
FIG. 12 shows a synchronization source or synchronization reference of V2X, based on an embodiment of the present disclosure.

FIG. 12 shows a synchronization source or synchronization reference of V2X, based on an embodiment of the present disclosure. The embodiment of FIG. 12 may be combined with various embodiments of the present disclosure.

Referring to FIG. 12, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

A SL synchronization source may be associated/related with a synchronization priority. For example, a relation between the synchronization source and the synchronization priority may be defined as shown in Table 5 or Table 6. Table 5 or Table 6 are for exemplary purposes only, and the relation between the synchronization source and the synchronization priority may be defined in various forms.

TABLE 5

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) having low priority | Remaining UE(s) having low priority |

In Table 5 or Table 6, P0 may denote a highest priority, and P6 may denote a lowest priority. In Table 5 or Table 6, the BS may include at least one of a gNB and an eNB.

Whether to use GNSS-based synchronization or BS-based synchronization may be (pre-)configured. In a single-carrier operation, the UE may derive transmission timing of the UE from an available synchronization reference having the highest priority.

Meanwhile, in various embodiments of the present disclosure, for example, "configured/configuration" or "defined/definition" may include that a base station or a network transmits information related to "configuration" or information related to "definition" to a UE through pre-defined signaling (e.g., SIB, MAC, RRC, etc.). For example, "configured/configuration" or "defined/definition" may include that the base station or the network configures or pre-configures information related to "configuration" or information related to "definition" for the UE.

Meanwhile, a UE may be (pre-)configured with a resource pool for SL transmission and reception. For example, a network may configure or pre-configure the resource pool related to SL communication to the UE. For example, the network may be a base station, a V2X server, and the like. In addition, the UE may perform SL transmission/reception by using resource(s) in the resource pool.

Meanwhile, in a licensed carrier, that is, in a carrier in which Uu link (e.g., uplink and/or downlink) and SL coexist, a SL resource pool may be additionally determined or configured based on a TDD UL DL configuration. Through this, interference between DL and SL can be reduced or avoided.

Meanwhile, according to the TDD UL DL configuration, a single pattern or a plurality of patterns including DL resource(s) and/or UL resource(s) may be repeated with a specific period. For example, the base station may transmit the TDD UL DL configuration to the UE through RRC signaling. Tables 7 and 8 show an example of the TDD UL DL configuration (TDD-UL-DL-ConfigCommon). For details related to the TDD UL DL configuration, refer to 3GPP TS 38.331 V15.8.0 and 3GPP TS 38.213 V15.8.0.

TABLE 8

TDD-UL-DL-ConfigCommon field descriptions referenceSubcarrierSpacing
Reference SCS used to determine the time domain boundaries in the UL-DL pattern which must be common across all subcarrier specific carriers, i.e., independent of the actual subcarrier spacing using for data transmission. Only the values 15, 30 or 60 kHz (FR1), and 60 or 120 kHz (FR2) are applicable. The network configures a not larger than any SCS of configured BWPs for the serving cell. See TS 38.213 [13], clause 11.1.

TDD-UL-DL-Pattern field descriptions dl-UL-TransmissionPeriodicity
Periodicity of the DL-UL pattern, see TS 38.213 [13], clause 11.1. If the dl-UL-TransmissionPeriodicity-v1530 is signalled, UE shall ignore the dl-UL-TransmissionPeriodicity (without suffix).
nrofDownlinkSlots
Number of consecutive full DL slots at the beginning of each DL-UL pattern, see TS 38.213 [13], clause 11.1. In this release, the maximum value for this field is 80.
nrofDownlinkSymbols
Number of consecutive DL symbols in the beginning of the slot following the last full DL slot (as derived from nrofDownlinkSlots). The value 0 indicates that there is no partial-downlink slot. (see TS 38.213 [13], clause 11.1).
nrofUplinkSlots
Number of consecutive full UL slots at the end of each DL-UL pattern, see TS 38.213 [13], clause 11.1. In this release, the maximum value for this field is 80.
nrofUplinkSymbols
Number of consecutive UL symbols in the end of the slot preceding the first full UL slot (as derived from nrofUplinkSlots). The value 0 indicates that there is no partial-uplink slot. (see TS 38.213 [13], clause 11.1).

Referring to Tables 7 and 8, information related to each pattern (TDD-UL-DL-Pattern) may include information related to the number of DL slots, the number of DL symbols, the number of UL slots and/or the number of UL symbols. For example, the base station may allocate as many DL resources as the number of DL slots configured through RRC signaling from the start time of each pattern, and then may allocate as many DL resources as the number of DL symbols configured through RRC signaling from the first symbol in the next slot of the last DL slot in the pattern. For

TABLE 7

The IE TDD-UL-DL-ConfigCommon determines the cell specific Uplink/Downlink TDD configuration.

TDD-UL-DL-ConfigCommon information element

```
-- ASN1START
-- TAG-TDD-UE-DL-CONFIGCOMMON-START
TDD-UL-DL-ConfigCommon : :=            SEQUENCE {
   referenceSubcarrierSpacing             SubcarrierSpacing,
   pattern1                               TDD-UL-DL-Pattern,
   pattern2                               TDD-UL-DL-Pattern
OPTIONAL, -- Need R
   ...
}
TDD-UL-DL-Pattern : :=                 SEQUENCE {
   dl-UL-TransmissionPeriodicity          ENUMERATED {ms0p5, ms0p625, ms1, ms1p25, ms2,
ms2p5, ms5, ms10},
   nrofDownlinkSlots                      INTEGER (0..maxNrofSlots),
   nrofDownlinkSymbols                    INTEGER. (0..maxNrofSymbols-1),
   nrofUplinkSlots                        INTEGER (0..maxNrofSlots),
   nrofUplinkSymbols                      INTEGER (0..maxNrofSymbols-1),
   ...,
   [[
   dl-UL-TransmissionPeriodicity-v1530    ENUMERATED {ms3, ms4}
OPTIONAL -- Need R
   ]]
}
-- TAG-TDD-UL-DL-CONFIGCOMMON-STOP
-- ASN1STOP
``` example, the base station may allocate as many UL resources as the number of UL slots configured through RRC signaling from the end time of each pattern, and then may allocate as many UL resources as the number of UL symbols configured through RRC signaling from the last symbol in the previous slot of the first UL slot in the pattern. The single pattern or the plurality of patterns may be repeatedly applied in units of a period (or sum of periods). For example, the UE which receives the TDD UL DL configuration from the base station can know that DL resources and/or UL resources are allocated as shown in FIG. 13.

Figure 13:
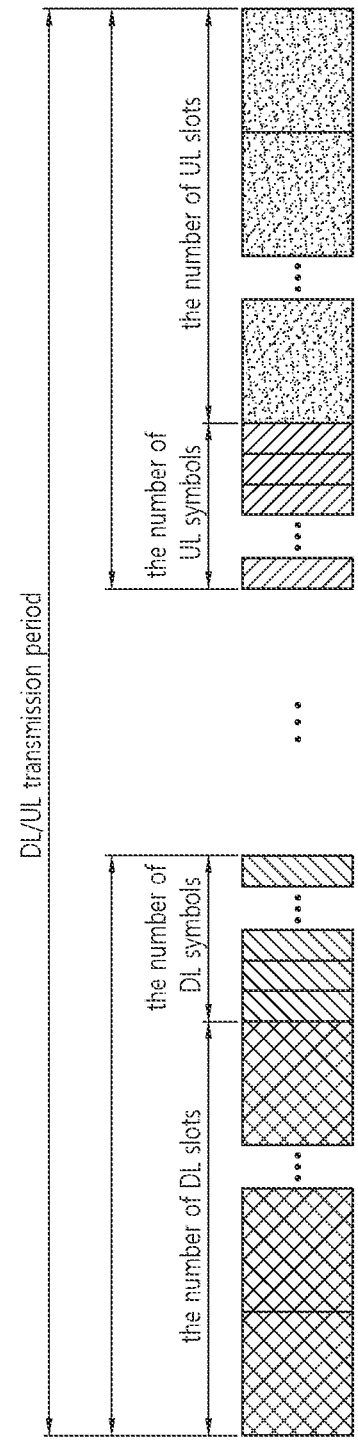
FIG. 13 shows DL resources and UL resources allocated based on a TDD UL DL configuration, based on an embodiment of the present disclosure.

FIG. 13 shows DL resources and UL resources allocated based on a TDD UL DL configuration, based on an embodiment of the present disclosure. The embodiment of FIG. 13 may be combined with various embodiments of the present disclosure.

Meanwhile, the UE may transmit a PSBCH to another UE, and the PSBCH may include all or part of the TDD UL DL configuration information. Alternatively, the PSBCH may include information on slot(s) in which the UE can use for (provisionally) SL communication. In an embodiment of the present disclosure, information on slot(s) that can be used for SL communication indicated by the PSBCH may be referred to as reference SL resource information. For example, the reference SL resource information may be expressed as the number of slots that can be used for SL communication within a period indicated by the PSBCH. For example, based on the reference SL resource information, SL available resources may be allocated as many as the number of slots configured/indicated from the end time of the period. The pattern may be repeatedly applied in units of a period. When analyzing the pattern, the number of slots and/or the number of symbols may be set to be the same as SCS information for a SL BWP or may be interpreted based on the corresponding value.

Meanwhile, in the case of resources for SL transmission/reception in a slot, the start symbol and/or the number of symbols may be configured or pre-configured for the UE for each SL BWP. For example, a symbol period that can be used for SL may be configured for the UE. For example, the UE may borrow some UL resources and use it as SL resources. In the above case, if only some symbols among symbols in the slot are configured as UL, the UE needs to determine whether the corresponding slot can be used as a SL slot.

Meanwhile, a length of a symbol period of a SL SSB (hereinafter, S-SSB) may be different from a length of a symbol period of other SL channels (e.g., PSCCH/PSSCH and/or PSFCH). For example, it may not be allowed for one or more UEs to transmit S-SSBs in the form of TDM and/or FDM within the same slot. That is, the S-SSBs may be mapped in different slots.

Meanwhile, a plurality of resource pools may be configured for the UE in a SL BWP. In addition, for example, the UE may transmit PSCCH(s) and/or PSSCH(s) by using resources in different resource pools. Meanwhile, the UE may be (pre-)configured with (RX) resource pools including all of the plurality of (TX) resource pools, and the UE may receive PSCCH(s) and/or PSSCH(s) transmitted by other UEs in the resource pools.

Meanwhile, the UE may determine a TDD pattern indicated by the PSBCH based on a TDD pattern of Uu link. In this case, according to the limit of the PSBCH payload size and the accessible SCS information, a method in which the UE can efficiently indicate/represent the TDD pattern may be required.

Hereinafter, based on various embodiments of the present disclosure, a method for configuring a resource pool for SL transmission and reception and an apparatus supporting the same are proposed. For example, a network may configure or pre-configure resource pool(s) for SL transmission/reception for a UE. For example, the network may transmit information related to the resource pool(s) for SL transmission/reception to the UE. For example, the network may be a base station or a V2X server. Hereinafter, "configured" may include "configured from a network" or "pre-configured from a network".

For example, SL resources in a SL resource pool may be configured as entire cell-specific UL resources for the UE. Alternatively, for example, SL resources in a SL resource pool may be configured as a part of cell-specific UL resources for the UE. To this end, if the network configures the resource pool for the UE, the network may configure the resource pool for the UE only for UL resources indicated by the (cell-specific) TDD UL DL configuration. However, considering SL communication between an in-coverage UE and an out-of-coverage UE, a method for the network to configure the resource pool for the UE regardless of the TDD UL DL configuration may be required. Alternatively, considering SL communication between the in-coverage UE and the out-of-coverage UE, a method for the out-of-coverage UE to obtain information related to the TDD UL DL configuration or information equivalent/similar to the information related to the TDD UL DL configuration may be required.

For example, the in-coverage UE may transmit a PSBCH including information related to the TDD UL DL configuration to the out-of-coverage UE. Meanwhile, in consideration of the signaling overhead of the PSBCH, the information related to the TDD UL DL configuration included in the PSBCH may be simplified information, compared with information related to the TDD UL DL configuration received by the in-coverage UE from the network. For example, reference SL resource information may be transmitted through the PSBCH. However, the reference SL resource information may not accurately represent the location of cell-specific UL resources that can be expressed in the TDD UL DL configuration.

Meanwhile, SL resource pool information for SL communication may be different between a UE which configures a resource pool based on the TDD UL DL configuration and a UE which configures a resource pool based on the reference SL resource information included in the PSBCH. Accordingly, SL transmission and reception between the UEs may be inefficient or impossible. In order to avoid the above problem, the network may configure reference SL resource information for the in-coverage UE. For example, the network may configure reference SL resource information for the in-coverage UE through RRC signaling. For example, the reference SL resource information may be configured as the same manner as content in the PSBCH. For example, the reference SL resource information indicated through the RRC configuration may include information related to a period and/or information related to the number of slots that can be used for SL communication within a period. The UE may determine that as many resources as the number of slots that can be used for SL communication from the end time within the configured period are resources available for SL. Alternatively, the information related to the period may be information related to a combination of periods of a plurality of patterns. For example, the plurality of patterns may be two patterns. In this case, the UE may determine that as many resources as the number of slots that can be used for SL communication from the end time of the second pattern are resources available for SL. Alternatively, the UE may determine that as many resources as the number of slots that can be used for SL communication from the end time of the first pattern and all resources in the second pattern are resources available for SL. Alternatively, the UE may determine that as many resources as the number of slots that can be used for SL communication from the end time of the first pattern and as many resources as the number of slots that can be used for SL communication from the end time of the second pattern are resources available for SL. In case the UE interprets the pattern, the number of slots and/or the number of symbols is configured to be the same as SCS information for a SL BWP, or the UE may interpret the pattern based on the corresponding value. In the above case, the understanding of the resource pool between the in-coverage UE and the out-of-coverage UE may be the same, if resources are configured in the form of using some resources for the SL available slot configured/indicated by the reference SL resource information when configuring the resource pool. Alternatively, the reference SL resource information indicated by the PSBCH and/or the RRC signaling may be expressed as information on SL slots or SL resources in a pattern and/or another pattern to which the pattern is applied or a bitmap. For example, the UE may not always apply the pattern periodically. Instead, the UE or the network may indicate/represent a time when the pattern is actually applied by using a bitmap within a specific period, and the bitmap may be repeated with a (pre-)configured period.

Meanwhile, the UE may transmit information on UL slot(s) through the PSBCH. For example, the information on the UL slot(s) indicated by a content (hereinafter, PSBCH content) transmitted by the UE through the PSBCH may include at least one of information on a pattern (e.g., the number of patterns), information on a period (e.g., the sum of all periods or a combination of periods) and/or information on the number of UL slots in each pattern. For example, a single pattern may include two patterns, and the sum of the periods of the two patterns may be set to a period of the single pattern, and DL-to-UL switching may exist only once within the single pattern. For example, a single pattern with a period of 4 ms may be expressed as a combination of a first pattern with a period of 1 ms and a second pattern with a period of 3 ms. If a single pattern is represented by a combination of two patterns, the UE may skip signaling for indicating/representing information on the pattern, and the UE may use signaling for indicating/representing information on the pattern to indicate/represent UL slot information (e.g., information on the number of UL slots).

For example, the UE may transmit information related to the combination of periods through the PSBCH. For example, information related to the combination of periods may consist of 4 bits. For example, the UE may indicate/represent the combination of periods by using 4 bits on the PSBCH. For example, the combination of periods may be as shown in Table 9. Table 9 is only an example, and combination of periods may be defined in various forms.

TABLE 9

| | information related to the combination of periods | |
|---|---|---|
| | The period of the first pattern (ms) | The period of the second pattern (ms) |
| 1 | 0.5 | 0.5 |
| 2 | 0.625 | 0.625 |

TABLE 9-continued

| | information related to the combination of periods | |
|---|---|---|
| | The period of the first pattern (ms) | The period of the second pattern (ms) |
| 3 | 1 | 1 |
| 4 | 0.5 | 2 |
| 5 | 2 | 0.5 |
| 6 | 1.25 | 1.25 |
| 7 | 1 | 3 |
| 8 | 3 | 1 |
| 9 | 2 | 2 |
| 10 | 1 | 4 |
| 11 | 4 | 1 |
| 12 | 2 | 3 |
| 13 | 3 | 2 |
| 14 | 2.5 | 2.5 |
| 15 | 5 | 5 |
| 16 | 10 | 10 |

Additionally, for example, the UE may jointly indicate/represent the number of each of UL slots in each of the two indicated/represented patterns by using additional bits (e.g., 9 bits, 8 bits, or 7 bits) on the PSBCH.

Meanwhile, if the UE transmits information on UL slot(s) through the PSBCH, the UE may indicate/represent the PSBCH content by dividing a case in which the number of patterns is one and a case in which the number of patterns is two. In this case, if the number of patterns is two, the UE may exclude information on the number of UL slots for a type in which DL-to-UL switching exists only once from indicateable value(s). For example, only if the ratio of the number of UL slots to the total number of slots in the two patterns is less than or equal to a specific threshold value, the UE may transmit information on UL slot(s) through the PSBCH. For example, only if the ratio of the number of UL slots to the total number of slots in the two patterns is less than or equal to a specific threshold value, the UE may determine that information on UL slot(s) can be indicated through the PSBCH content. For example, the specific threshold value may be 0.6 or 0.5, or the like. For example, the UE may receive information related to the specific threshold value from a network or a base station. For example, the information related to the specific threshold value may be configured or pre-configured for the UE. For example, the information related to the specific threshold value may be pre-defined for the UE. Through this, PSBCH signaling overhead can be reduced.

For example, based on the in-coverage UE, the reference SL resource may include all or part of UL slot(s) indicated in the (cell-specific) TDD UL DL configuration. More specifically, if the TDD UL DL configuration is configured with a plurality of patterns, the reference SL resource may include UL slot(s) of the last pattern. For example, if the TDD UL DL configuration is configured with a plurality of patterns and the last pattern is all configured with UL slots, the reference SL resource may include UL slot(s) of the previous pattern of the last pattern. Additionally/alternatively, if all symbols between the start and the end of SL symbols configured for the UE in a slot correspond to UL resources in the TDD UL DL configuration, the corresponding slot may be included in the reference SL resource even if only some symbols in the slot are UL resources.

Meanwhile, information on UL slot(s) that can be transmitted/indicated through the PSBCH may be configured for the UE based on a specific reference SCS. More specifically, in consideration of the signaling overhead of the PSBCH, the reference SCS may be different based on information on the pattern (e.g., the number of patterns) and/or information on the period (e.g., the sum of all periods or a combination of periods). For example, basically, information on UL slot(s) indicated by the PSBCH content may be transmitted based on SCS information for the PSBCH or reference SCS information used in the TDD UL DL configuration. For example, the reference SCS information may be pre-configured for the UE by the base station or the network. For example, the maximum value of SCS information (e.g., u value in Table 1 or Table 2) applicable to the UE may be limited based on the information on the pattern and/or the information on the period. For example, if two patterns are used and the sum of the total periods is 4 (ms) or 5 (ms), the maximum value of SCS applicable to the UE may be configured to 2 (i.e., 60 kHz) for the UE. For example, if two patterns are used and the sum of the total periods is 10 (ms), the maximum value of SCS applicable to the UE may be configured to 1 (i.e., 30 kHz) for the UE. For example, if two patterns are used and the sum of the total periods is 20 (ms), the maximum value of SCS applicable to the UE may be configured to 0 (i.e., 15 kHz) for the UE.

For example, the reference SCS information related to information on UL slot(s) transmitted by the UE through the PSBCH may be configured or pre-configured/defined for the UE. For example, the reference SCS information may be information related to SCS used in the PSBCH content. For example, the reference SCS information (i.e., u value) may be configured or defined for the UE (appropriately) based on a combination of pattern(s) and/or period(s) indicated by the PSBCH content. For example, for a combination of specific pattern(s) and/or specific period(s), the UE may expect or determine that SCS is not configured to exceed the maximum value. In this case, if the reference SCS information used in the TDD UL DL configuration is greater than the reference SCS information used in the PSBCH content (in the case of a high SCS value), the UE may not be able to sufficiently indicate the TDD UL DL configuration by using the PSBCH content. Therefore, for example, if a plurality of slots in the TDD UL DL configuration which are overlapped with a slot based on SCS related to the PSBCH content are all available for SL communication (e.g., if all symbols corresponding to the start SL symbol index and the number of SL symbols configured in a SL BWP are cell-specific UL), the UE may set/indicate the corresponding slot as a UL slot when setting the PSBCH content. On the other hand, the UE may not set/indicate other slots as UL slots when setting the PSBCH content.

In the above situation, the in-coverage UE may consider the PSBCH content configuration and the reference SCS information in the procedure of extracting the reference SL resource for resource pool configuration from the TDD UL DL configuration. For example, if all slots of the TDD UL DL configuration in the corresponding slot are available for SL communication in a unit of a slot based on SCS related to the PSBCH content (e.g., if all symbols corresponding to the start SL symbol index and the number of SL symbols configured in a SL BWP are cell-specific UL), the UE may include all slots overlapping a slot based on SCS related to the corresponding PSBCH content in the reference SL resource. On the other hand, the UE may not include other slots in the reference SL resource.

Alternatively, the reference SL resource may include DL resource(s) and/or flexible (F) resource(s) in the TDD UL DL configuration value. In this case, the DL resource and/or the F resource may be finally excluded when configuring the resource pool later.

For example, a procedure in which the UE selects a resource pool may include a procedure in which the UE selects all or part of slots in the reference SL resource. For example, for all or part of the reference SL resource, the UE or the network may indicate slot(s) to be included in the resource pool by using a bitmap. For example, the size of the bitmap may be (pre-)configured, and the corresponding bitmap may be repeatedly applied periodically.

For example, a set of slots in the reference SL resource may be extended to slots in a radio frame. Alternatively, for example, a set of slots in the reference SL resource may be extended to 10240 slots. Alternatively, for example, a set of slots in the reference SL resource may be extended to slots in a period for S-SSB. Alternatively, for example, a set of slots in the reference SL resource may be extended to slots in a period for the S-SSB bundle. Alternatively, for example, a set of slots in the reference SL resource may be extended to slots in S-SSB slots adjacent to each other. Alternatively, for example, a set of slots in the reference SL resource may be extended to slots in a period for a (pre-)configured resource pool. For example, the resource pool may be configured or pre-configured for the UE. That is, a pattern may be repeated according to periodic information, and through this, the pattern may be converted into information in a radio frame. Alternatively, a set of slots in the reference SL resource may be extended to slots corresponding to 20 msec. Alternatively, a set of slots in the reference SL resource may be extended to slots in the total period derived from tdd-UL-DL-ConfigurationCommon. For example, if two patterns are indicated/informed by tdd-UL-DL-ConfigurationCommon and each has P and P1 as a period, the total period may be P+P1. The set of slots in the reference SL resource may be extended to slots in P+P1.

For example, the UE may exclude slot(s) configured for the S-SSB from slots in the reference SL resource in a radio frame. For example, the UE may infer or determine slot(s) configured for the S-SSB based on period information and slot offset information for the S-SSB. Thereafter, the UE may configure slots in the SL resource pool by repeatedly applying the bitmap to the remaining slots in the radio frame. If the bitmap is not completely applied at the end of the radio frame, for example, if the number of remaining slots in the radio frame is not a multiple of the bitmap size, the UE may apply only the applicable part from the front part of the bitmap and ignore the rest.

For example, the UE may exclude slot(s) configured for the S-SSB from slots in the extended reference SL resource. Meanwhile, if a period of the reference SL resource is 20 msec, or if a period of the reference SL resource is set to the total period derived from tdd-UL-DL-ConfigurationCommon, it may be inefficient for the UE to apply the same bitmap information between a period in which the S-SSB is included and a period in which the S-SSB is not included. Accordingly, according to each period of the reference SL resource or whether the S-SSB is included in each period, the UE may use different (pre-)configured bitmap information. The bitmap information may include a size of a bitmap and/or a bitmap value. For example, if the UE sets the size of the bitmap used in the period including the S-SSB to a value obtained by subtracting the number of S-SSB slots from the size of the bitmap used in the period not including the S-SSB, the amount of resources reserved within the corresponding period may be minimized.

For example, the UE may exclude slot(s) configured for the S-SSB from slots in the reference SL resource in a radio frame. For example, the UE may infer or determine slot(s) configured for the S-SSB based on period information and slot offset information for the S-SSB. Thereafter, the UE may configure reserved slot(s) for the remaining slots in the radio frame, and the UE may exclude the reserved slot(s) from slots in the reference SL resource in the radio frame. If the number of remaining slots in the radio frame is not a multiple of the bitmap size, the bitmap may not be completely applied. To avoid this, the reserved slot(s) that does not apply the bitmap may be configured. In this case, if the reserved slot(s) is crowded in a specific time period, there is a possibility that a delay problem may occur. Accordingly, the reserved slot(s) needs to be distributed as evenly as possible in the remaining slots except for the S-SSB slot(s) in the reference SL resource. Thereafter, for remaining slots in the radio frame except for the S-SSB slot(s) and the reserved slot(s) in the reference SL resource, the UE may configure slots in the SL resource pool by repeatedly applying the bitmap. Table 10 or Table 11 shows an example of the above-described method.

TABLE 10

UE procedure for determining resource block pool and slot pool for sidelink transmission mode 1 and 2
The set of slots that may belong to a sidelink resource pool for sidelink transmission mode 1 or 2 is denoted by $(t_0^{SL}, t_1^{SL}, ..., t_{T_{max}}^{SL})$ where
- $0 \le t_i^{SL} < 10240 \cdot 2^\mu$ for a SCS configuration $\mu$,
- the slot index is relative to slot#0 of the radio frame corresponding to SFN 0 of the serving cell or DFN 0,
- the set includes all the slots except the following slots,
- slots in which S-SSB resource is configured,
- invalid slots for sidelink as indicated by PSBCH or higher layer parameter referenceSLslots,
- reserved slots which are determined by the following steps:
    1) the remaining slots excluding $N_{invalid}$ and $N_{S-SSB}$ slots from the set of all the slots are denoted by $(l_0, l_1, ... , l_{10240 \cdot 2^\mu - N_{invalid} - N_{S-SSB} - 1})$ arranged in increasing order of slot index, where $N_{S-SSB}$ is the number of slots in which S-SSB resource is configured within a frame and $N_{invalid}$ is the number of invalid slots for sidelink within a frame.
    2) a slot $l_r$ $(0 \le r < (10240 \cdot 2^\mu - N_{invalid} - N_{S-SSB} - 1))$ belongs to the reserved slots if r =

$$\left\lfloor \frac{m(10240 \cdot 2^\mu - N_{invalid} - N_{S-SSB})}{N_{reserved}} \right\rfloor$$

where m = 0, 1, . . . $N_{reserved}$ −1 and $N_{reserved}$ = (10240 · $2^\mu$ − $N_{invalid}$ − $N_{S-SSB}$) mod $L_{bitmap}$. Here, $L_{bitmap}$, the length of the bitmap is configured by higher layers.
   - the slots are arranged in increasing order of slot index.
The UE determines the set of slots assigned to a sidelink resource pool as follows:
   - A bitmap $(b_0, b_1,...,b_{L_{bitmap}})$ associated with the resource pool is used where $L_{bitmap}$ the length of the bitmap is configured by higher layers.
   - A slot $t_i^{SL}(0 \le k < (10240 \cdot 2^\mu - N_{invalid} - N_{S-SSB} - N_{reserved}))$ belongs to the slot pool if $b_{k'}$ = 1 where k' = k mod $L_{bitmap}$.

TABLE 11

In the frequency domain, a sidelink resource pool consists of sl-NumSubchannel contiguous sub-channels. A sub-channel consists of sl-SubchannelSize contiguous PRBs, where sl-NumSubchannel and sl-SubchannelSize are higher layer parameters.
The set of slots that may belong to a sidelink resource pool is denoted by $(t_0^{SL}, t_1^{SL}, ... , t_{T_{max}-1}^{SL})$ where
- $0 \le t_i^{SL} < 10240 \times 2^\mu$, $0 \le i < T_{max}$,
- the slot index is relative to slot#0 of the radio frame corresponding to SFN 0 of the serving cell or DFN 0,
- the set includes all the slots except the following slots,
    - $N_{S-SSB}$ slots in which S-SS/PSBCH block (S-SSB) is configured,
    - $N_{nonSL}$ slots in each of which at least one of Y-th, (Y + 1)-th, ..., (Y + X − 1 )-th OFDM symbols are not semi-statically configured as UL as per the higher layer parameter tdd-UL-DL-ConfigurationCommon-r16 of the serving cell if provided or sl-TDD-Configuration-r16 if provided or sl-TDD-Config-r16 of the received PSBCH if provided, where Y and X are set by the higher layer parameters sl-StartSymbol and sl-LengthSymbols, respectively.
    - The reserved slots which are determined by the following steps.
      1) the remaining slots excluding $N_{S-SSB}$ slots and $N_{nonSL}$ slots from the set of all the slots are denoted by $(l_0, l_1, ... , l_{(10240 \times 2^\mu - N_{SSB} - N_{nonSL} - 1)})$ arranged in increasing order of slot index.
      2) a slot $l_r$ $(0 \le r < 10240 \times 2^\mu - N_{SSB} - N_{nonSL})$ belongs to the reserved slots if r =

$$\left\lfloor \frac{m(10240 \times 2^\mu - N_{SSB} - N_{nonSL})}{N_{reserved}} \right\rfloor,$$

here m = 0,1, ... ,$N_{reserved}$ − 1 and $N_{reserved}$ = (10240 × $2^\mu$ − $N_{SSB}$ − $N_{nonSL}$) mod $L_{bitmap}$ where $L_{bitmap}$ denotes the length of bitmap configured by higher layers.
   - The slots in the set are arranged in increasing order of slot index.
The UE determines the set of slots assigned to a sidelink resource pool as follows:
   - a bitmap $(b_0, b_1, ... ,b_{L_{bitmap}-1})$ associated with the resource pool is used where $L_{bitmap}$ the length of the bitmap is configured by higher layers.
   - a slot $t_k^{SL}$ $(0 \le k < 10240 \times 2^\mu - N_{SSB} - N_{nonSL} - N_{reserved})$ belongs to the set if $b_{k'}$ = 1 where k' = k mod $L_{bitmap}$.
   - The slots in the set are re-indexed such that the subscripts i of the remaining slots $t_i^{SL}$ are successive {0, 1, ..., $T_{max}$ −1} where $T_{max}$ is the number of the slots remaining in the set.

TABLE 11-continued

The UE determines the set of resource blocks assigned to a sidelink resource pool as follows:
- The resource block pool consists of $N_{PRB}$ PRBs.
- The sub-channel m for m = 0,1, ... , numSubchannel − 1 consists of a set of $n_{subCHsize}$ contiguous resource blocks with the physical resource block number $n_{PRB} = n_{subCHRBstart} + m \cdot n_{subCHsize} + j$ for j = 0,1, ... , $n_{subCHsize}$ − 1, where $n_{subCHRBstart}$ and $n_{subCHsize}$ are given by higher layer parameters sl-StartRB-Subchannel and sl-SubchannelSize, respectively
A UE is not expected to use the last $N_{PRB}$ mod $n_{subCHsize}$ PRBs in the resource pool.

For example, the UE may configure reserved slots in slots in the reference SL resource in the radio frame, and the UE may exclude the reserved slots from the slots in the reference SL resource in the radio frame. If the number of slots in the reference SL resource in the radio frame is not a multiple of the bitmap size, the bitmap may not be completely applied. To avoid this, the reserved slots for which the bitmap is not applied may be configured. In this case, if the reserved slots are crowded in a specific time period, there is a possibility that a delay problem may occur. Accordingly, the reserved slots need to be distributed as evenly as possible in the slots in the reference SL resource. Thereafter, the UE may repeatedly apply the bitmap to the remaining slots in the radio frame except for the reserved slots in the reference SL resource. Thereafter, the UE may exclude slots configured for the S-SSB from among slots indicated by the bitmap from slots in the reference SL resource in the radio frame. For example, the UE may infer or determine slots configured for the S-SSB based on period information and slot offset information for the S-SSB. After the above process, the UE may configure the remaining slots configured by the bitmap as slots in the SL resource pool.

For example, the UE may repeatedly apply the bitmap to slots in the reference SL resource in the radio frame. More specifically, the size of the bitmap may be configured to be the same as a period of the reference SL resource pattern or may be configured to be a multiple of the period of the reference SL resource pattern. For example, a possible value for the size of the bitmap may be the number of slots that can be indicated within a specific period (e.g., 20 ms) for the reference SL resource pattern or the TDD configuration. For example, depending on the reference SCS value for the bitmap, a possible value for the size of the bitmap may be the number of UL slots or reference SL slots that can be indicated within 20 slots, 40 slots, 80 slots, and/or 160 slots, respectively. For example, in the case of SCS=120 kHz, possible values for the size of the bitmap may be 1, 2, . . . , 160. Since the number of UL slots may be indicated in units of one slot by the TDD configuration, a possible value for the size of the bitmap may also be in units of one slot. Meanwhile, if the size of the bitmap is small, the flexibility of the configuration may be reduced, so the minimum value of the size of the bitmap may be two. Alternatively, for example, the minimum value of the size of the bitmap may be a value (e.g., 10) greater than or equal to two. For example, since the supportable SCS value may be different for the FR1 and the FR2, the range of possible values for the size of the bitmap may be different according to the FR. For example, in the case of the FR1, the maximum value of the size of the bitmap may be 80. For example, the maximum value for the size of the bitmap may be different according to the reference SCS value for the bitmap. For example, if the reference SCS value is 15 kHz, the maximum value for the size of the bitmap may be 20. For example, if the reference SCS value is 30 kHz, the maximum value for the size of the bitmap may be 40. For example, if the reference SCS value is 60 kHz, the maximum value for the size of the bitmap may be 80. For example, if the reference SCS value is 120 kHz, the maximum value for the size of the bitmap may be 160.

For example, a first UE may transmit information on the size of the bitmap and/or bitmap information to a second UE. Herein, for example, the size of the bitmap information may be the maximum value of the size of the bitmap. In this case, the first UE may use only information corresponding to the size of the bitmap among the bitmap information as the bitmap information. For example, the second UE may determine that only information corresponding to the size of the bitmap among the bitmap information is valid bitmap information based on the information on the size of the bitmap and the bitmap information. For example, in terms of signaling, it is assumed that the size of the bitmap information is 160 bits, and the size of the bitmap is 20 bits. In this case, for example, the first UE may use only most significant bit (MSB) 20 bits among the 160-bit bitmap information as bitmap information, and the second UE may determine that only MSB 20 bits among the 160-bit bitmap information is valid bitmap information. For example, the first UE may use only least significant bit (LSB) 20 bits among the 160-bit bitmap information as bitmap information, and the second UE may determine that only LSB 20 bits among the 160-bit bitmap information is valid bitmap information.

Thereafter, the UE may exclude slots configured for the S-SSB from among slots indicated by the bitmap from slots in the reference SL resource in the radio frame. For example, the UE may infer or determine slots configured for the S-SSB based on period information and slot offset information for the S-SSB. After the above process, the UE may configure the remaining slots configured by the bitmap as slots in the SL resource pool.

In the above embodiment, the bitmap method has been mainly described, but the technical idea of the present disclosure can be extended and applied to a form of indicating start and/or end slot information or a method of indicating other methods.

In the above embodiment, for example, the UE may apply the reference SL resource pattern and/or the bitmap in units of a slot based on SCS information related to the TDD UL DL configuration. For example, the UE may apply the reference SL resource pattern and/or the bitmap in units of a slot based on SCS information for the corresponding SL resource pool or the SL BWP. For example, the UE may apply the reference SL resource pattern and/or the bitmap in units of a slot based on SCS information related to the PSBCH content. For example, the UE may apply the reference SL resource pattern and/or the bitmap in units of a slot based on (pre-)configured or pre-defined reference SCS information. For example, the (pre-)configured or pre-defined reference SCS information may be 15 kHz. For example, the (pre-)configured or pre-defined reference SCS information may be different according to the FR1 or the FR2.

If the reference SCS information to be used for configuring the resource pool is separately configured for the UE, the corresponding SCS information value (i.e., u value) may be less than or equal to the reference SCS information value related to the PSBCH content and/or the reference SCS information value related to the TDD UL DL configuration. Alternatively, there may be no restrictions, and in this case, if a part of a plurality of slots of the reference SL resource and/or slots for the TDD UL DL configuration and/or slots indicated by the PSBCH content which are overlapped with a slot corresponding to one bit of the bitmap according to the reference SCS information value to be used for configuring the resource pool does not satisfy the SL usage condition (e.g., symbols corresponding to the number of SL symbols from the starting SL symbol in the corresponding slot are cell-specific UL symbols), the UE cannot turn on the corresponding bit.

For example, the SL resource pool configuration may include frequency domain information. Depending on a carrier, in order to utilize it for SL communication without wasting/dropping resources, the network may transmit resource pool information including the starting RB index of the lowest subchannel and/or the number of RBs included in the resource pool to the UE. For example, the network may configure or pre-configure the starting RB index of the lowest subchannel and/or the number of RBs included in the resource pool for the UE. In this case, the number of RBs included in the resource pool may not be a multiple of the subchannel size. In the above-described situation, subchannels included in the resource pool may have different sizes. For example, in the above-described situation, all subchannels other than the first subchannel among subchannels included in the resource pool may have a (pre-)configured subchannel size. For example, in the above-described situation, all subchannels other than the last subchannel among subchannels included in the resource pool may have a (pre-)configured subchannel size. For example, in the above-described situation, all subchannels other than the middle subchannel among subchannels included in the resource pool may have a (pre-)configured subchannel size. In this case, for example, if the number of subchannels included in the resource pool is an even number, the middle subchannel in the resource pool may be a subchannel having a low index among two subchannels located in the middle. For example, if the number of subchannels included in the resource pool is an even number, the middle subchannel in the resource pool may be a subchannel having a high index among two subchannels located in the middle. For example, if the number of subchannels included in the resource pool is an even number, the middle subchannel in the resource pool may include two subchannels located in the middle. In addition, for example, the size of the first subchannel may be a value obtained by subtracting a value obtained by multiplying the number of subchannels−1 by the configured subchannel size from the number of RBs in the resource pool. For example, the size of the first subchannel may be obtained by Equation 1.

The size of the first subchannel=the number of RBs within resource pool−{(the number of subchannels−1)×configured subchannel size} [Equation 1]

For example, the size of the last subchannel may be a value obtained by subtracting a value obtained by multiplying the number of subchannels−1 by the configured subchannel size from the number of RBs in the resource pool. For example, the size of the last subchannel may be obtained by Equation 2.

The size of the last subchannel=the number of RBs within resource pool−{(the number of subchannels−1)×configured subchannel size} [Equation 2]

For example, the size of the middle subchannel may be a value obtained by subtracting a value obtained by multiplying the number of subchannels−1 by the configured subchannel size from the number of RBs in the resource pool. For example, the size of the middle subchannel may be obtained by Equation 3.

The size of the middle subchannel=the number of RBs within resource pool−{(the number of subchannels−1)×configured subchannel size} [Equation 3]

Meanwhile, depending on the UE, a subchannel having a size different from the configured subchannel size may not be used. For example, a UE with a specific version may not use a subchannel different from the value of the configured subchannel size, and a UE with another version may use a subchannel different from the value of the configured subchannel size. Meanwhile, if UEs having different versions exist in the same resource pool, a method of interpreting the first SCI may be different depending on the version of the UE. For example, all or part of bit information of a reserved field included in the first SCI may be used to indicate/represent the version of the UE and/or the frequency domain resource.

For example, the first UE may inform the second UE of the version of the first UE by using a reserved field (e.g., 1 bit) included in a SCI. For example, if the value of the reserved field is 0, the second UE may assume/determine that the first UE does not use the specific subchannel and interpret a frequency domain resource indicator. For example, if the value of the reserved field is 1, the second UE may estimate/determine a frequency resource for a PSSCH by using a frequency domain resource indicator and another reserved field (e.g., 1 bit). Specifically, for example, if the field value for the frequency domain resource indicator is different depending on whether or not the specific subchannel is used, an additionally reserved field (e.g., 1 bit) may be used as the frequency domain resource indicator. Otherwise, the second UE may interpret the existing frequency domain resource indicator by including the specific subchannel. In the above, if the second UE interprets the frequency domain resource indicator by including the specific subchannel, a case in which the specific subchannel is allocated alone may be excluded from the indicationable value. That is, a PSCCH may not be transmitted through the specific subchannel. Alternatively, the second UE may always interpret the existing frequency domain resource indicator by including the specific subchannel. In this case, all combinations of PSSCH frequency assignments except for the specific subchannel may be expressed, whereas some combinations of PSSCH frequency assignments including the specific subchannel may not be expressed.

For example, if the first UE transmits a value of a reserved field (e.g., 1 bit) and a frequency domain resource indicator value to the second UE through a SCI, the second UE may estimate/determine a frequency resource for a PSSCH based on a combination of the value of the reserved field (e.g., 1 bit) and the frequency domain resource indicator value. For example, if the value of the reserved field is 0, the second UE may interpret the frequency domain resource indicator for the remaining subchannels except for the specific subchannel. For example, if the value of the reserved field is 1, the first UE may indicate/represent frequency resource allocation for a PSSCH that is additionally generated by including the specific subchannel to the second UE. For example, in this case, at least one of the indicated PSSCH resources may include the specific subchannel. In the above, if the second UE interprets the frequency domain resource indicator by including the specific subchannel, a case in which the specific subchannel is allocated alone may be excluded from the indicationable value. For example, if the first UE sets some bit value of the reserved field to 1 and the second UE interprets the frequency domain resource indicator by including the specific subchannel, indexing of the frequency domain resource indicator value starts from a case in which the number of allocated subchannels is 2, and if the second resource includes the specific subchannel, the indicator value may be increased according to the start index of the possible third resource. Next, if the third resource includes the specific subchannel, the indicator value may be increased according to the start index of the possible second resource. For example, the two orders may be changed. Next, it may be an indexing type in which the above method is repeated while increasing the number of subchannels again. For example, the above method may be a case of indicating a maximum of three resources in the first SCI. For example, if the first UE indicates a maximum of two resources in the SCI, and if the first UE sets some bit value of the reserved field to 1 and the second UE interprets the frequency domain resource indicator by including the specific subchannel, indexing of the frequency domain resource indicator value may start from a case in which the number of allocated subchannels is 2. In this case, if the second resource includes the specific subchannel, the indicator value may be increased in the order of the case in which the second resource includes the specific subchannel when the number of allocated subchannels is 3. Next, it may be an indexing form in which the above method is repeated while increasing the number of subchannels again.

Alternatively, for example, according to the number of RBs in the resource pool, the size of all or part of subchannels may be readjusted. For example, a rounded down value of a value obtained by dividing the number of RBs in the resource pool by the configured subchannel size may be set to the number of subchannels in the resource pool. Next, the size of the subchannel may be readjusted by a rounded down value of a value obtained by dividing the number of RBs in the resource pool by the number of subchannels. Alternatively, the size of the subchannel may be readjusted by a rounded up value of a value obtained by dividing the number of RBs in the resource pool by the number of subchannels.

Figure 14:
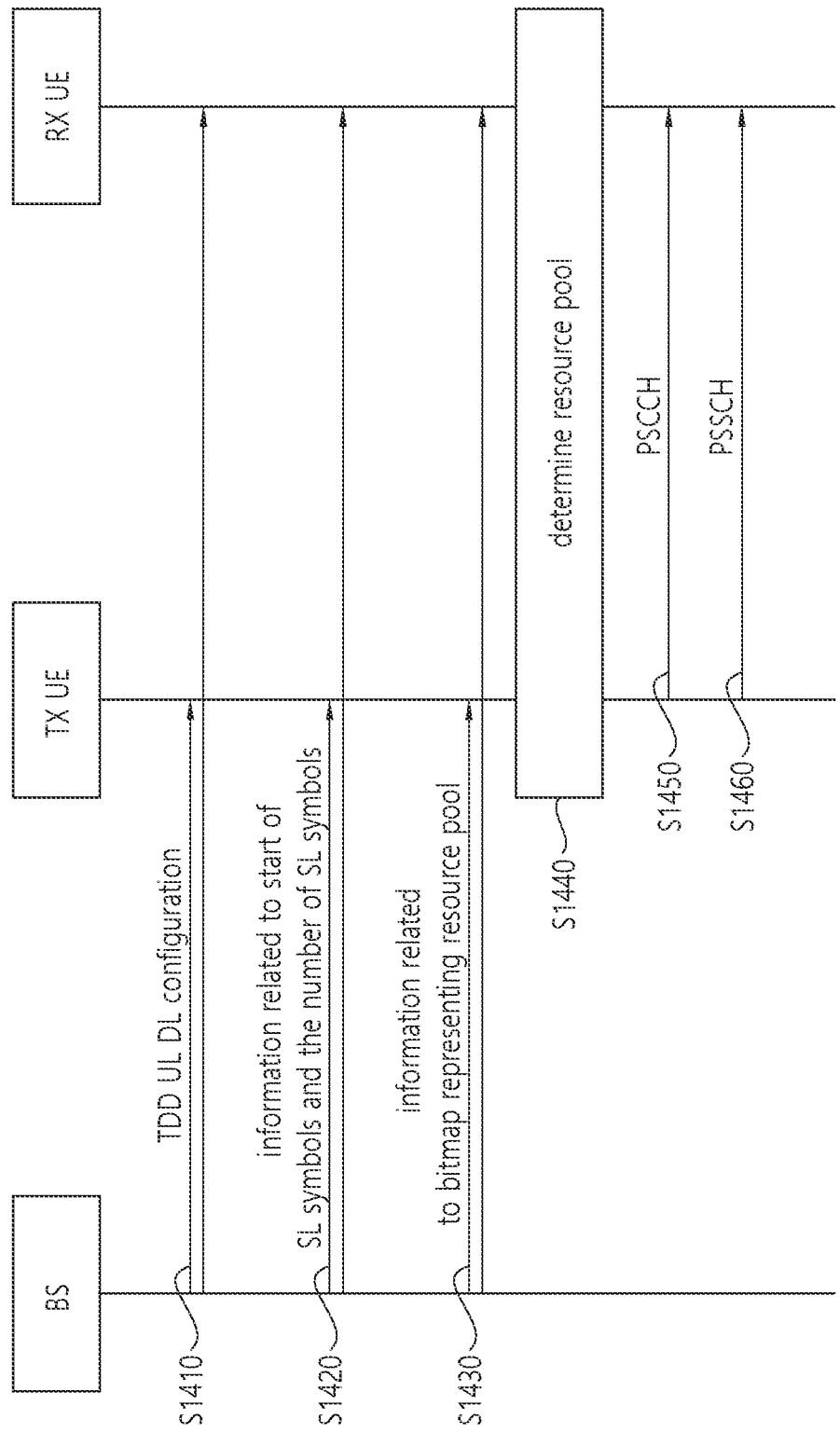
FIG. 14 shows a procedure for a UE to determine a resource pool, based on an embodiment of the present disclosure.

FIG. 14 shows a procedure for a UE to determine a resource pool, based on an embodiment of the present disclosure. The embodiment of FIG. 14 may be combined with various embodiments of the present disclosure.

Referring to FIG. 14, in step S1410, the base station may transmit the TDD UL DL configuration to the UE. In the embodiment of FIG. 14, it is assumed that the transmitting UE and the receiving UE are within the coverage of the base station.

In step S1420, the base station may transmit information related to the start of SL symbols and information related to the number (i.e., length) of the SL symbols to the UE. For example, the information related to the start of the SL symbols and the information related to the number (i.e., length) of the SL symbols may be configured for each SL BWP to the UE. For example, the base station may transmit a SL BWP configuration including the information related to the start of the SL symbols and the information related to the number (i.e., length) of the SL symbols to the UE. In step S1430, the base station may transmit information related to the bitmap indicating/representing the resource pool to the UE.

In step S1440, the transmitting UE and the receiving UE may determine the resource pool based on the TDD UL DL configuration, the information related to the start of the SL symbols, the information related to the number (i.e., length) of the SL symbols, and the information related to the bitmap.

Specifically, for example, the UE may determine a plurality of second slots by excluding one or more slots in which at least one symbol among the SL symbols is not configured as a UL resource from a plurality of first slots.

For example, if at least one symbol among Y-th, (Y+1)-th, (Y+X−1)-th OFDM symbols in a specific slot is not configured as a UL symbol (i.e., if at least one symbol among Y-th, (Y+1)-th, (Y+X−1)-th OFDM symbols in a specific slot does not correspond to a UL symbol), the specific slot may be excluded from the resource pool. For example, if all Y-th, (Y+1)-th, (Y+X−1)-th OFDM symbols in a specific slot are configured as UL symbols (i.e., all Y-th, (Y+1)-th, (Y+X−1)-th OFDM symbols in a specific slot correspond to UL symbols), the specific slot may be included in the resource pool. Herein, Y may indicate/represent the location of the start symbol of the SL symbols, and X may indicate/represent the number (i.e., length) of the SL symbols.

Figure 15:
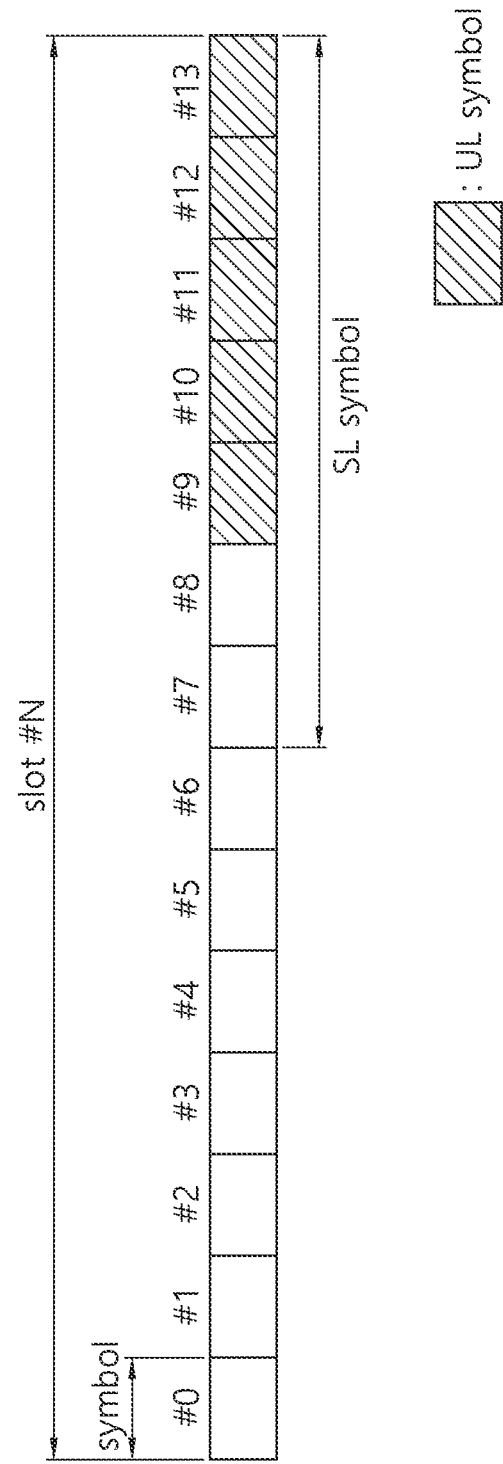
FIG. 15 shows a slot excluded from a resource pool, based on an embodiment of the present disclosure.

FIG. 15 shows a slot excluded from a resource pool, based on an embodiment of the present disclosure. The embodiment of FIG. 15 may be combined with various embodiments of the present disclosure.

In the embodiment of FIG. 15, it is assumed that symbols #9 to #13 in the slot #N are configured as UL symbols by the TDD UL DL configuration. In this case, the UE may determine that symbols #9 to #13 in the slot #N are configured as UL symbols based on the TDD UL DL configuration. Furthermore, it is assumed that symbols #7 to #13 are configured as SL symbols by the SL BWP configuration. In this case, Y may be 7, and X may be 7. In the above case, some symbols (i.e., symbols #7 to #8) among symbols #7 to #13 in the slot #N may be symbols that are not configured as UL symbols. In this case, the slot #N may be excluded from the resource pool.

Figure 16:
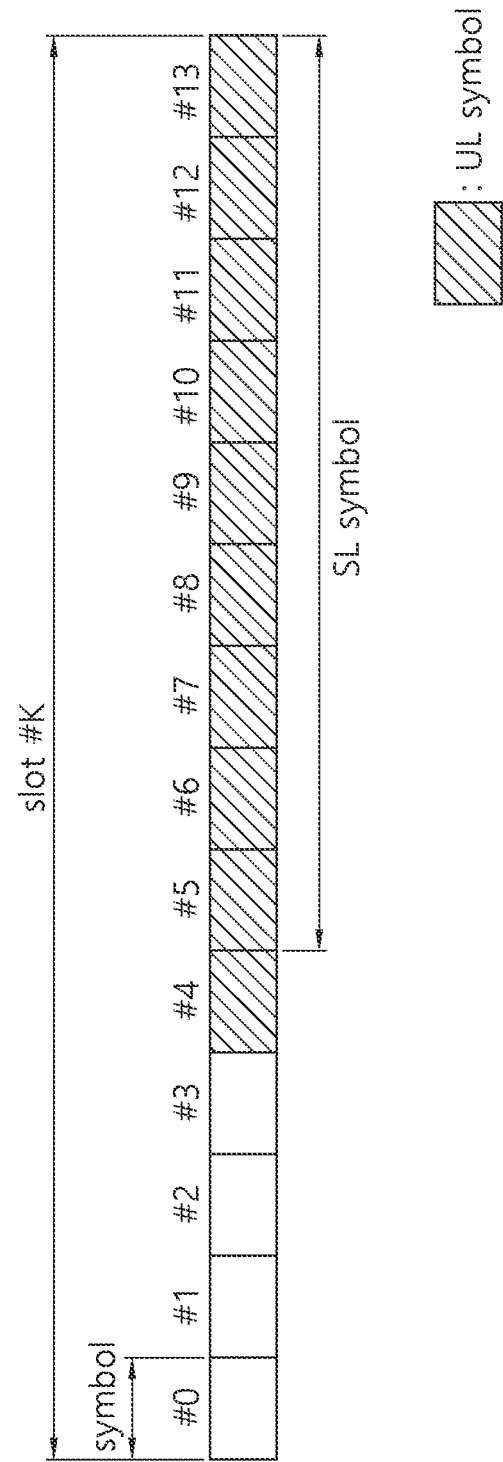
FIG. 16 shows a slot that can be included in a resource pool, based on an embodiment of the present disclosure.

FIG. 16 shows a slot that can be included in a resource pool, based on an embodiment of the present disclosure. The embodiment of FIG. 16 may be combined with various embodiments of the present disclosure.

In the embodiment of FIG. 16, it is assumed that symbols #4 to #13 in the slot #K are configured as UL symbols by the TDD UL DL configuration. In this case, the UE may determine that symbols #4 to #13 in the slot #K are configured as UL symbols based on the TDD UL DL configuration. Furthermore, it is assumed that symbols #5 to #13 are configured as SL symbols by the SL BWP configuration. In this case, Y may be 5 and X may be 9. In the above case, all symbols #5 to #13 in the slot #K may be symbols configured as UL symbols. In this case, the slot #K may be included in the resource pool.

Referring back to FIG. 14, additionally, for example, the UE may determine a plurality of third slots by excluding one or more slots in which the S-SSB is configured from the plurality of second slots. Additionally, for example, the UE may determine a plurality of fourth slots by excluding one or more reserved slots from the plurality of third slots. Additionally, for example, the UE may determine a plurality of fifth slots from among the plurality of fourth slots as the resource pool based on the bitmap. Specifically, for example, the UE may apply the bitmap to the plurality of fourth slots. In this case, among the plurality of fourth slots, a slot corresponding to bitmap 1 may be included in the resource pool and a slot corresponding to bitmap 0 may be excluded from the resource pool.

In step S1450, the transmitting UE may transmit a PSCCH to the receiving UE based on the resource pool. In step S1460, the transmitting UE may transmit a PSSCH related to the PSCCH to the receiving UE based on the resource pool.

Figure 17:
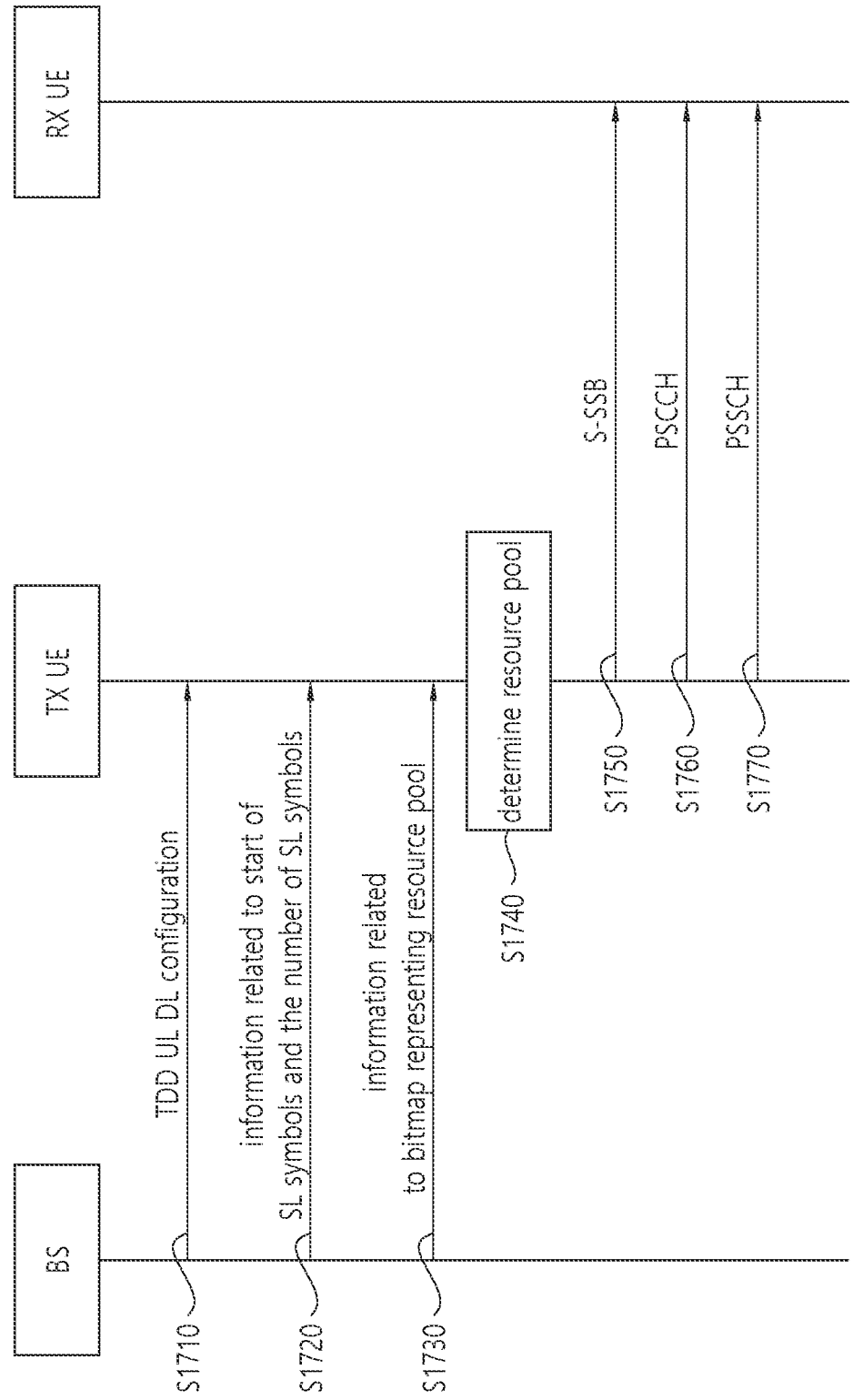
FIG. 17 shows a procedure for a UE to determine a resource pool, based on an embodiment of the present disclosure.

FIG. 17 shows a procedure for a UE to determine a resource pool, based on an embodiment of the present disclosure. The embodiment of FIG. 17 may be combined with various embodiments of the present disclosure.

Referring to FIG. 17, in step S1710, the base station may transmit the TDD UL DL configuration to the UE. In the embodiment of FIG. 17, it is assumed that the transmitting UE is within the coverage of the base station and the receiving UE is outside the coverage of the base station.

In step S1720, the base station may transmit information related to the start of SL symbols and information related to the number (i.e., length) of the SL symbols to the UE. For example, the information related to the start of the SL symbols and the information related to the number (i.e., length) of the SL symbols may be configured for each SL BWP to the UE. For example, the base station may transmit the SL BWP configuration including the information related to the start of the SL symbols and the information related to the number (i.e., length) of the SL symbols to the UE. In step S1730, the base station may transmit the information related to the bitmap indicating/representing the resource pool to the UE.

In step S1740, the transmitting UE may determine the resource pool based on the TDD UL DL configuration, the information related to the start of the SL symbols, the information related to the number (i.e., length) of the SL symbols, and the information related to the bitmap. Herein, since the detailed method of determining the resource pool has been described above, it is omitted.

In step S1750, the transmitting UE may transmit the S-SSB to the receiving UE. For example, the S-SSB may include information related to SL slot(s) determined by the transmitting UE.

Additionally, in step S1760, the transmitting UE may transmit a PSCCH to the receiving UE based on the resource pool. Additionally, in step S1770, the transmitting UE may transmit a PSSCH related to the PSCCH to the receiving UE based on the resource pool.

Based on various embodiments of the present disclosure, if the network configures the SL resource pool for the UE, the in-coverage UE and the out-of-coverage UE can efficiently perform SL communication. Furthermore, the UE can secure as many SL available slots as possible based on the TDD UL DL pattern of Uu link, and the UE can efficiently indicate/represent the TDD UL DL pattern through the PSBCH.

Figure 18:
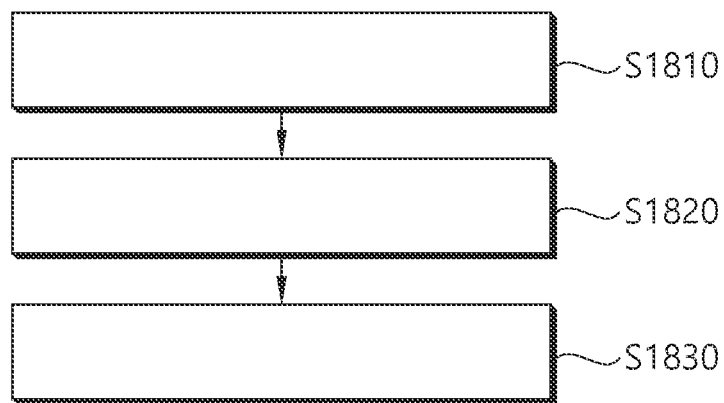
FIG. 18 shows a method for a first device to perform wireless communication, based on an embodiment of the present disclosure.

FIG. 18 shows a method for a first device to perform wireless communication, based on an embodiment of the present disclosure. The embodiment of FIG. 18 may be combined with various embodiments of the present disclosure.

Referring to FIG. 18, in step S1810, the first device may receive, from a base station, a time division duplex uplink-downlink (TDD UL-DL) configuration including information related to an uplink (UL) resource. In step S1820, the first device may receive, from the base station, information related to a start of sidelink (SL) symbols, information related to a number of the SL symbols, and a bitmap representing one or more slots included in a SL resource pool. In step S1830, the first device may determine the SL resource pool. For example, a plurality of second slots may be determined by excluding one or more slots in which at least one symbol among the SL symbols is not configured as the UL resource from a plurality of first slots, and a plurality of third slots may be determined by excluding one or more slots in which a sidelink-synchronization signal block (S-SSB) is configured from the plurality of second slots, and a plurality of fourth slots may be determined by excluding one or more reserved slots from the plurality of third slots, and a plurality of fifth slots among the plurality of fourth slots may be determined as the SL resource pool based on the bitmap.

For example, the one or more reserved slots may be excluded from the plurality of third slots, based on a number of the plurality of third slots not being a multiple of a size of the bitmap. For example, a number of the plurality of fourth slots may be a multiple of the size of the bitmap. For example, a minimum value of the size of the bitmap may be 10. For example, a maximum value of the size of the bitmap may be 160.

Additionally, for example, the first device may obtain a number of SL slots, based on the information related to the UL resource, reference subcarrier spacing (SCS) information related to the TDD UL-DL configuration, and SCS information related to a SL bandwidth part (BWP). Additionally, for example, the first device may transmit, to a second device, a physical sidelink broadcast channel (PSBCH) including information related to the number of the SL slots. For example, the UL resource may include at least one of a UL slot or a UL symbol. For example, the number of the SL slots may be obtained by converting a number of UL slots and a number of UL symbols based on the SCS information related to the SL BWP. For example, based on one or more symbols in a first slot determined based on the start of the SL symbols and the number of the SL symbols which are all configured as a UL resource, the first slot may be determined to be a SL slot. For example, based on at least one symbol among one or more symbols in a second slot determined based on the start of the SL symbols and the number of the SL symbols which are not configured as a UL resource, the second slot may not be determined to be a SL slot.

For example, the plurality of fifth slots related to 1 of the bitmap among the plurality of fourth slots may be included in the SL resource pool, and slots related to 0 of the bitmap among the plurality of fourth slots may be excluded from the SL resource pool.

For example, the information related to the start of the SL symbols and the information related to the number of the SL symbols may be configured for each SL BWP. For example, the bitmap may be configured for each SL resource pool.

The proposed method may be applied to the device(s) based on various embodiments of the present disclosure. First, the processor 102 of the first device 100 may control the transceiver 106 to receive, from a base station, a time division duplex uplink-downlink (TDD UL-DL) configuration including information related to an uplink (UL) resource. In addition, the processor 102 of the first device 100 may control the transceiver 106 to receive, from the base station, information related to a start of sidelink (SL) symbols, information related to a number of the SL symbols, and a bitmap representing one or more slots included in a SL resource pool. In addition, the processor 102 of the first device 100 may determine the SL resource pool. For example, a plurality of second slots may be determined by excluding one or more slots in which at least one symbol among the SL symbols is not configured as the UL resource from a plurality of first slots, and a plurality of third slots may be determined by excluding one or more slots in which a sidelink-synchronization signal block (S-SSB) is configured from the plurality of second slots, and a plurality of fourth slots may be determined by excluding one or more reserved slots from the plurality of third slots, and a plurality of fifth slots among the plurality of fourth slots may be determined as the SL resource pool based on the bitmap.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, a time division duplex uplink-downlink (TDD UL-DL) configuration including information related to an uplink (UL) resource; receive, from the base station, information related to a start of sidelink (SL) symbols, information related to a number of the SL symbols, and a bitmap representing one or more slots included in a SL resource pool; and determine the SL resource pool. For example, a plurality of second slots may be determined by excluding one or more slots in which at least one symbol among the SL symbols is not configured as the UL resource from a plurality of first slots, and a plurality of third slots may be determined by excluding one or more slots in which a sidelink-synchronization signal block (S-SSB) is configured from the plurality of second slots, and a plurality of fourth slots may be determined by excluding one or more reserved slots from the plurality of third slots, and a plurality of fifth slots among the plurality of fourth slots may be determined as the SL resource pool based on the bitmap.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a base station, a time division duplex uplink-downlink (TDD UL-DL) configuration including information related to an uplink (UL) resource; receive, from the base station, information related to a start of sidelink (SL) symbols, information related to a number of the SL symbols, and a bitmap representing one or more slots included in a SL resource pool; and determine the SL resource pool. For example, a plurality of second slots may be determined by excluding one or more slots in which at least one symbol among the SL symbols is not configured as the UL resource from a plurality of first slots, and a plurality of third slots may be determined by excluding one or more slots in which a sidelink-synchronization signal block (S-SSB) is configured from the plurality of second slots, and a plurality of fourth slots may be determined by excluding one or more reserved slots from the plurality of third slots, and a plurality of fifth slots among the plurality of fourth slots may be determined as the SL resource pool based on the bitmap.

Based on an embodiment of the present disclosure, a non-transitory computer-readable storage medium storing instructions may be provided. For example, the instructions, when executed, may cause a first device to: receive, from a base station, a time division duplex uplink-downlink (TDD UL-DL) configuration including information related to an uplink (UL) resource; receive, from the base station, information related to a start of sidelink (SL) symbols, information related to a number of the SL symbols, and a bitmap representing one or more slots included in a SL resource pool; and determine the SL resource pool. For example, a plurality of second slots may be determined by excluding one or more slots in which at least one symbol among the SL symbols is not configured as the UL resource from a plurality of first slots, and a plurality of third slots may be determined by excluding one or more slots in which a sidelink-synchronization signal block (S-SSB) is configured from the plurality of second slots, and a plurality of fourth slots may be determined by excluding one or more reserved slots from the plurality of third slots, and a plurality of fifth slots among the plurality of fourth slots may be determined as the SL resource pool based on the bitmap.

Figure 19:
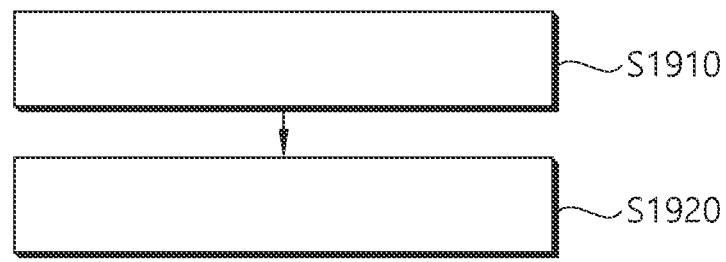
FIG. 19 shows a method for a base station to perform wireless communication, based on an embodiment of the present disclosure.

FIG. 19 shows a method for a base station to perform wireless communication, based on an embodiment of the present disclosure. The embodiment of FIG. 19 may be combined with various embodiments of the present disclosure.

Referring to FIG. 19, in step S1910, the base station may transmit, to a first device, a time division duplex uplink-downlink (TDD UL-DL) configuration including information related to an uplink (UL) resource. In step S1920, the base station may transmit, to the first device, information related to a start of sidelink (SL) symbols, information related to a number of the SL symbols, and a bitmap representing one or more slots included in a SL resource pool. For example, a plurality of second slots may be determined by excluding one or more slots in which at least one symbol among the SL symbols is not configured as the UL resource from a plurality of first slots, and a plurality of third slots may be determined by excluding one or more slots in which a sidelink-synchronization signal block (S-SSB) is configured from the plurality of second slots, and a plurality of fourth slots may be determined by excluding one or more reserved slots from the plurality of third slots, and a plurality of fifth slots among the plurality of fourth slots may be determined as the SL resource pool based on the bitmap.

The proposed method may be applied to the device(s) based on various embodiments of the present disclosure. First, the processor 202 of the base station 200 may control the transceiver 206 to transmit, to a first device, a time division duplex uplink-downlink (TDD UL-DL) configuration including information related to an uplink (UL) resource. In addition, the processor 202 of the base station 200 may control the transceiver 206 to transmit, to the first device, information related to a start of sidelink (SL) symbols, information related to a number of the SL symbols, and a bitmap representing one or more slots included in a SL resource pool. For example, a plurality of second slots may be determined by excluding one or more slots in which at least one symbol among the SL symbols is not configured as the UL resource from a plurality of first slots, and a plurality of third slots may be determined by excluding one or more slots in which a sidelink-synchronization signal block (S-SSB) is configured from the plurality of second slots, and a plurality of fourth slots may be determined by excluding one or more reserved slots from the plurality of third slots, and a plurality of fifth slots among the plurality of fourth slots may be determined as the SL resource pool based on the bitmap.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, a time division duplex uplink-downlink (TDD UL-DL) configuration including information related to an uplink (UL) resource; and transmit, to the first device, information related to a start of sidelink (SL) symbols, information related to a number of the SL symbols, and a bitmap representing one or more slots included in a SL resource pool. For example, a plurality of second slots may be determined by excluding one or more slots in which at least one symbol among the SL symbols is not configured as the UL resource from a plurality of first slots, and a plurality of third slots may be determined by excluding one or more slots in which a sidelink-synchronization signal block (S-SSB) is configured from the plurality of second slots, and a plurality of fourth slots may be determined by excluding one or more reserved slots from the plurality of third slots, and a plurality of fifth slots among the plurality of fourth slots may be determined as the SL resource pool based on the bitmap.

Based on an embodiment of the present disclosure, an apparatus configured to control a base station performing wireless communication may be provided. For example, the apparatus may comprise: one or more processors; and one or more memories operably connected to the one or more processors and storing instructions. For example, the one or more processors may execute the instructions to: transmit, to a first user equipment (UE), a time division duplex uplink-downlink (TDD UL-DL) configuration including information related to an uplink (UL) resource; and transmit, to the first UE, information related to a start of sidelink (SL) symbols, information related to a number of the SL symbols, and a bitmap representing one or more slots included in a SL resource pool. For example, a plurality of second slots may be determined by excluding one or more slots in which at least one symbol among the SL symbols is not configured as the UL resource from a plurality of first slots, and a plurality of third slots may be determined by excluding one or more slots in which a sidelink-synchronization signal block (S-SSB) is configured from the plurality of second slots, and a plurality of fourth slots may be determined by excluding one or more reserved slots from the plurality of third slots, and a plurality of fifth slots among the plurality of fourth slots may be determined as the SL resource pool based on the bitmap.

Based on an embodiment of the present disclosure, anontransitory computer-readable storage medium storing instructions may be provided. For example, the instructions, when executed, may cause a base station to: transmit, to a first device, a time division duplex uplink-downlink (TDD UL-DL) configuration including information related to an uplink (UL) resource; and transmit, to the first device, information related to a start of sidelink (SL) symbols, information related to a number of the SL symbols, and a bitmap representing one or more slots included in a SL resource pool. For example, a plurality of second slots may be determined by excluding one or more slots in which at least one symbol among the SL symbols is not configured as the UL resource from a plurality of first slots, and a plurality of third slots may be determined by excluding one or more slots in which a sidelink-synchronization signal block (S-SSB) is configured from the plurality of second slots, and a plurality of fourth slots may be determined by excluding one or more reserved slots from the plurality of third slots, and a plurality of fifth slots among the plurality of fourth slots may be determined as the SL resource pool based on the bitmap.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
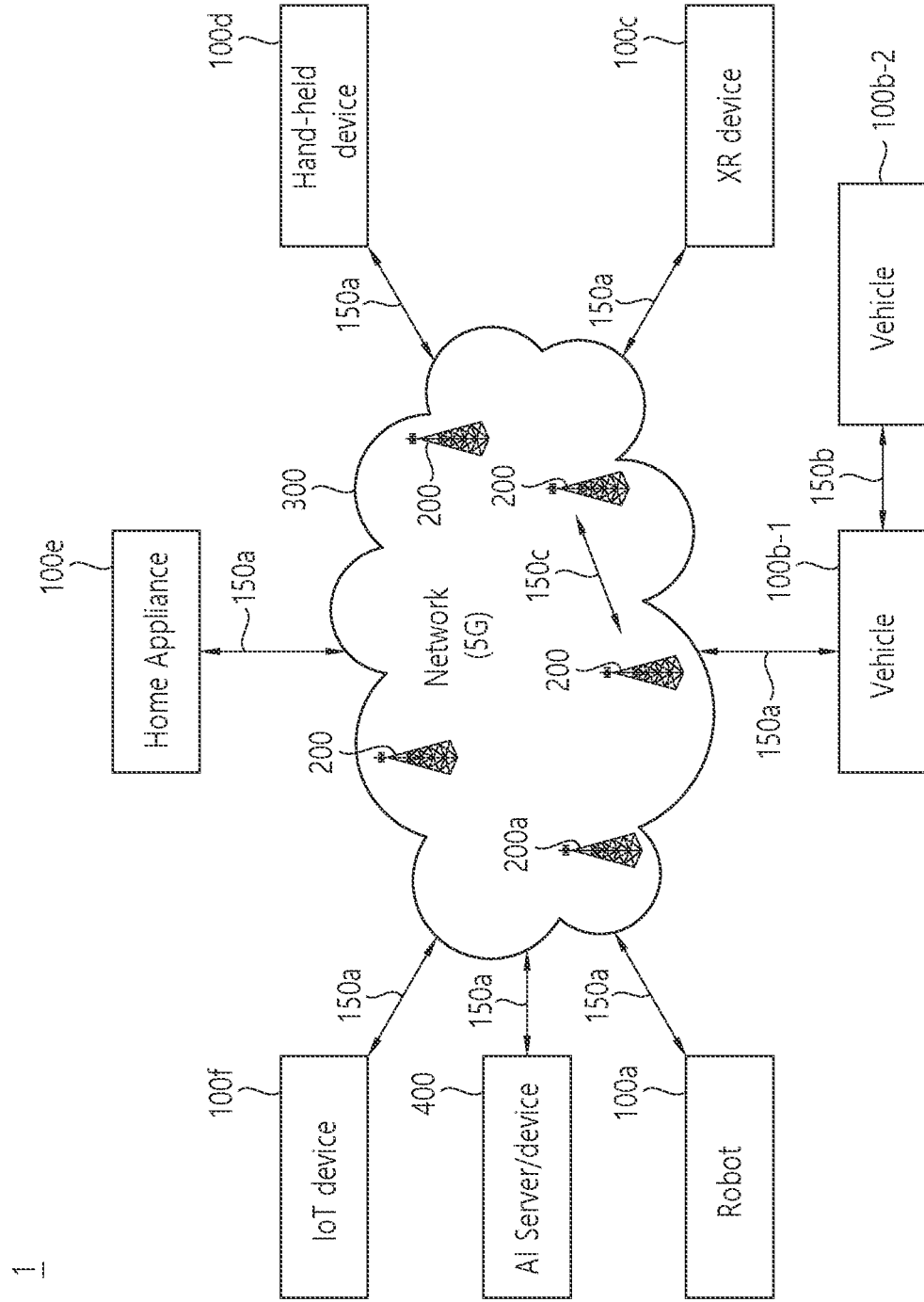
FIG. 20 shows a communication system 1, based on an embodiment of the present disclosure.

FIG. 20 shows a communication system 1, based on an embodiment of the present disclosure.

Referring to FIG. 20, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
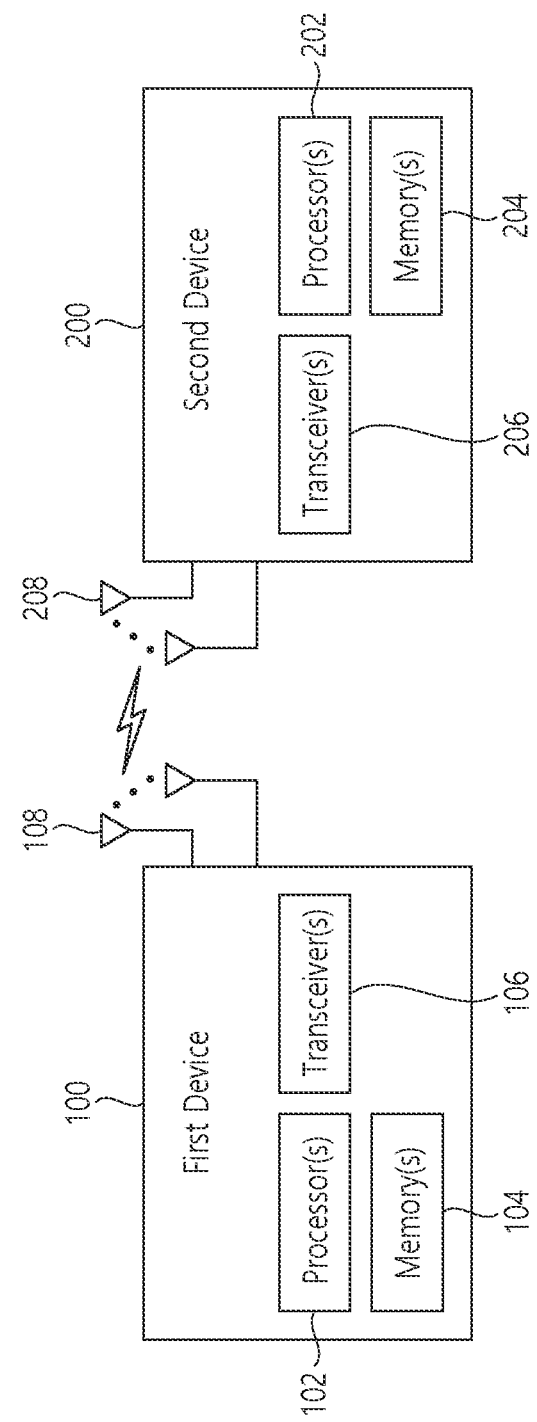
FIG. 21 shows wireless devices, based on an embodiment of the present disclosure.

FIG. 21 shows wireless devices, based on an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
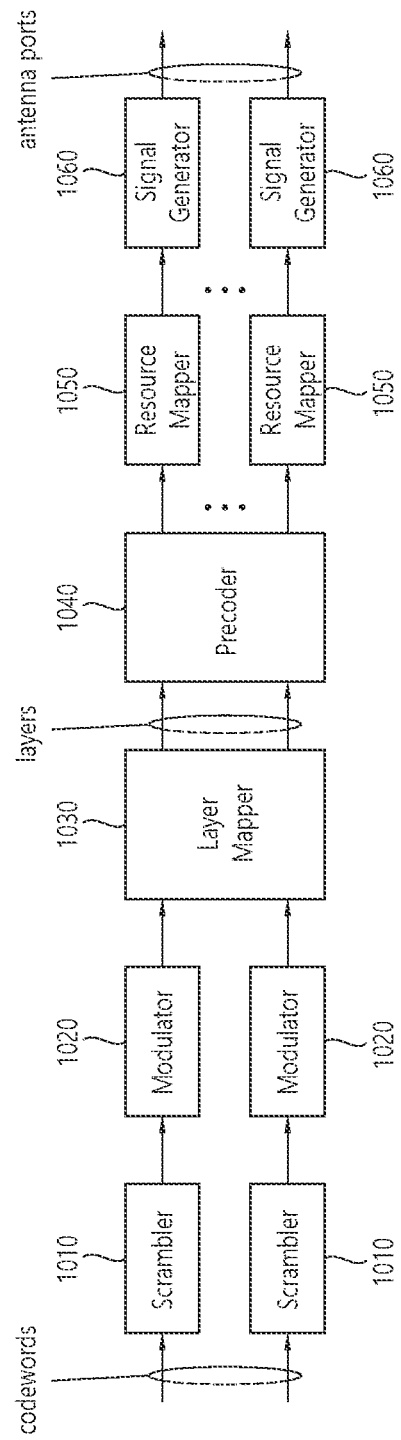
FIG. 22 shows a signal process circuit for a transmission signal, based on an embodiment of the present disclosure.

FIG. 22 shows a signal process circuit for a transmission signal, based on an embodiment of the present disclosure.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
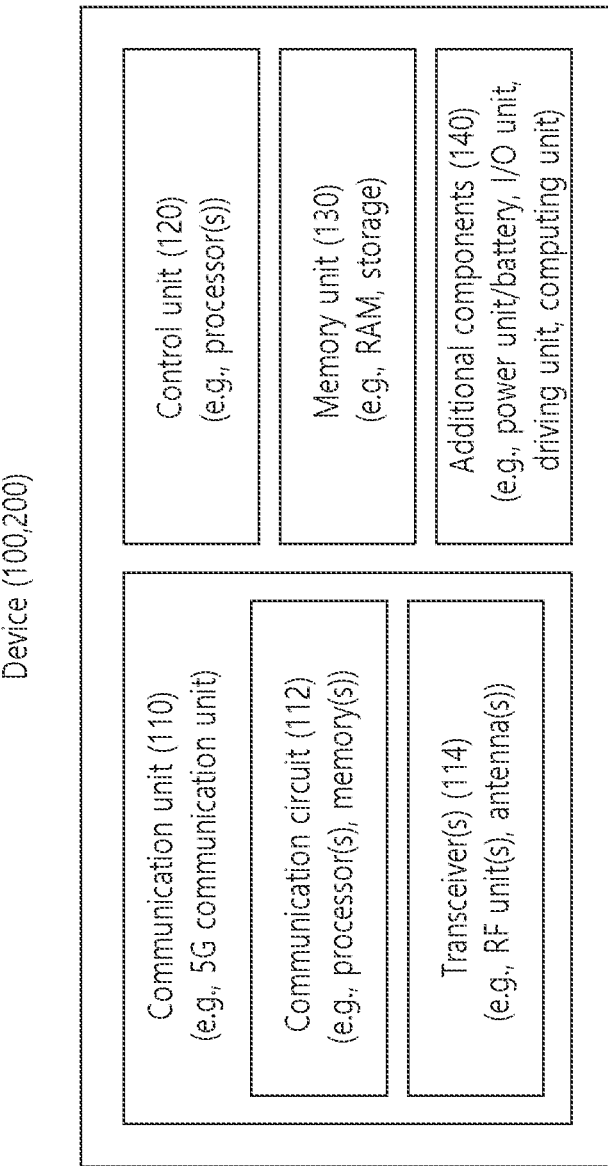
FIG. 23 shows another example of a wireless device, based on an embodiment of the present disclosure.

FIG. 23 shows another example of a wireless device, based on an embodiment of the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 20), the vehicles (100*b*-1 and 100*b*-2 of FIG. 20), the XR device (100*c* of FIG. 20), the hand-held device (100*d* of FIG. 20), the home appliance (100*e* of FIG. 20), the IoT device (100*f* of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
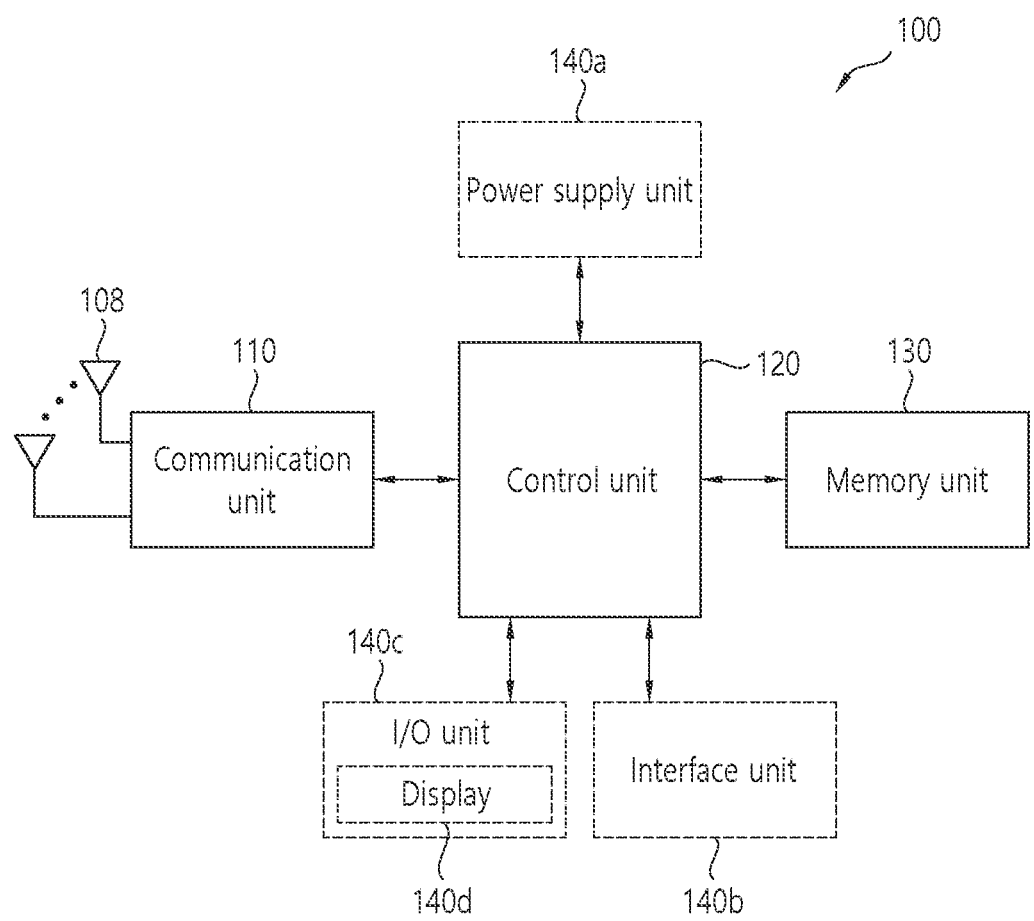
FIG. 24 shows a hand-held device, based on an embodiment of the present disclosure.

FIG. 24 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
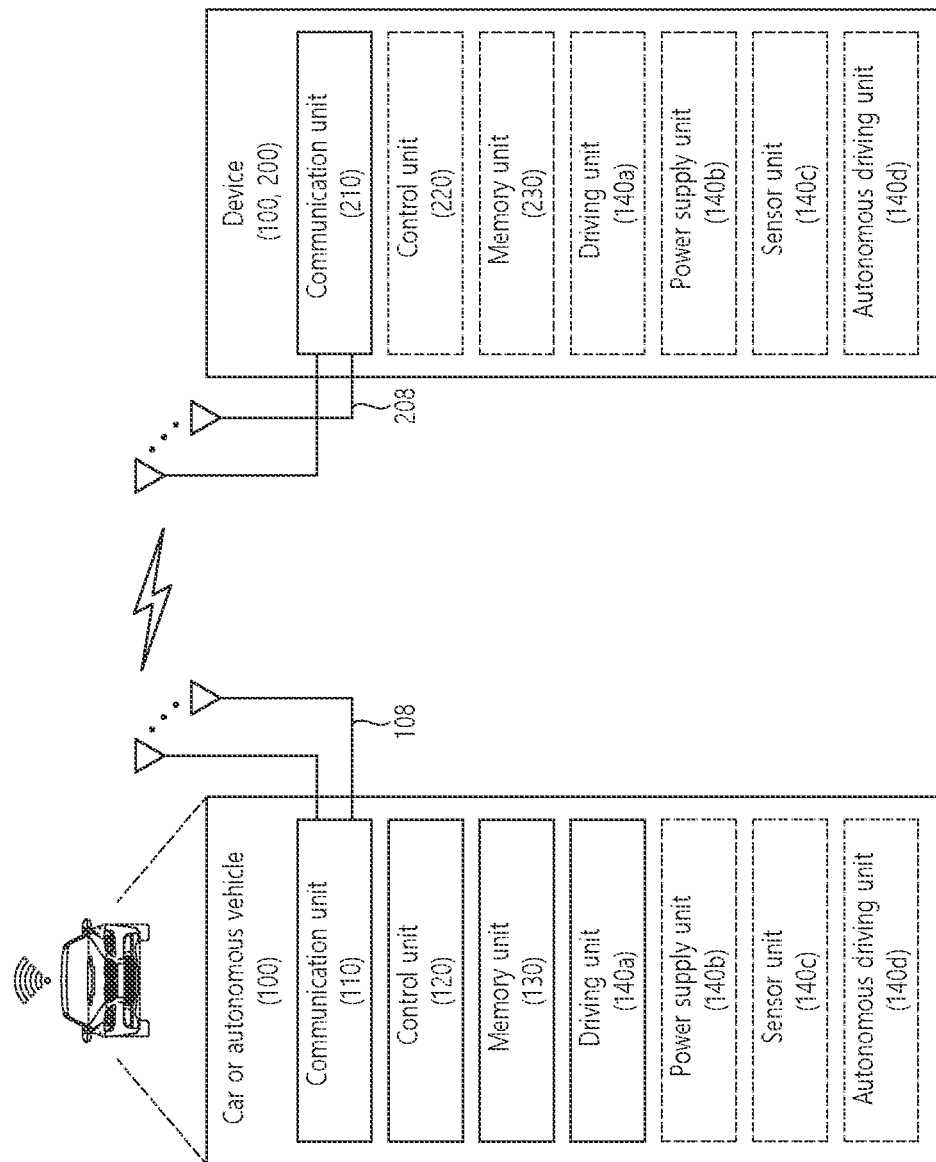
FIG. 25 shows a vehicle or an autonomous vehicle, based on an embodiment of the present disclosure.

FIG. 25 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 25, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
    obtaining a time division duplex uplink-downlink (TDD UL-DL) configuration including information related to an uplink (UL) resource;
    obtaining information related to a start of sidelink (SL) symbols, information related to a number of the SL symbols, and a bitmap representing one or more slots included in a SL resource pool;
    determining a plurality of second slots by excluding (i) one or more slots in which at least one symbol among the SL symbols is not configured as the UL resource and (ii) one or more slots in which a sidelink-synchronization signal block (S-SSB) is configured from a plurality of first slots;
    determining a plurality of third slots by excluding one or more reserved slots from the plurality of second slots; and
    determining a plurality of fourth slots assigned to the SL resource pool among the plurality of third slots,
    wherein the plurality of fourth slots related to 1 of the bitmap among the plurality of third slots are assigned to the SL resource pool, and
    wherein slots related to 0 of the bitmap among the plurality of third slots are excluded from the SL resource pool.

2. The method of claim 1, wherein the one or more reserved slots are excluded from the plurality of second slots, based on a number of the plurality of second slots not being a multiple of a size of the bitmap.

3. The method of claim 2, wherein a number of the plurality of third slots is a multiple of the size of the bitmap.

4. The method of claim 3, wherein a minimum value of the size of the bitmap is 10.

5. The method of claim 3, wherein a maximum value of the size of the bitmap is 160.

6. The method of claim 1, further comprising:
obtaining a number of SL slots, based on the information related to the UL resource, reference subcarrier spacing (SCS) information related to the TDD UL-DL configuration, and SCS information related to a SL bandwidth part (BWP); and
transmitting, to a second device, a physical sidelink broadcast channel (PSBCH) including information related to the number of the SL slots.

7. The method of claim 6, wherein the UL resource includes at least one of a UL slot or a UL symbol.

8. The method of claim 7, wherein the number of the SL slots is obtained by converting a number of UL slots and a number of UL symbols based on the SCS information related to the SL BWP.

9. The method of claim 6, wherein, based on one or more symbols in a first slot determined based on the start of the SL symbols and the number of the SL symbols which are all configured as a UL resource, the first slot is determined to be a SL slot.

10. The method of claim 6, wherein, based on at least one symbol among one or more symbols in a second slot determined based on the start of the SL symbols and the number of the SL symbols which are not configured as a UL resource, the second slot is not determined to be a SL slot.

11. The method of claim 1, wherein the TDD UL-DL configuration is received from a base station, and
wherein the information related to the start of the SL symbols, the information related to the number of the SL symbols, and the bitmap representing one or more slots included in the SL resource pool are received from the base station.

12. The method of claim 1, wherein the information related to the start of the SL symbols and the information related to the number of the SL symbols are configured for each SL BWP.

13. The method of claim 1, wherein the bitmap is configured for each SL resource pool.

14. A first device adapted to perform wireless communication, the first device comprising:
one or more memories storing instructions;
one or more transceivers; and
one or more processors connected to the one or more memories and the one or more transceivers, wherein the one or more processors execute the instructions to:
obtain a time division duplex uplink-downlink (TDD UL-DL) configuration including information related to an uplink (UL) resource;
obtain information related to a start of sidelink (SL) symbols, information related to a number of the SL symbols, and a bitmap representing one or more slots included in a SL resource pool;
determine a plurality of second slots by excluding (i) one or more slots in which at least one symbol among the SL symbols is not configured as the UL resource and (ii) one or more slots in which a sidelink-synchronization signal block (S-SSB) is configured from a plurality of first slots;
determine a plurality of third slots by excluding one or more reserved slots from the plurality of second slots; and
determine a plurality of fourth slots assigned to the SL resource pool among the plurality of third slots,
wherein the plurality of fourth slots related to 1 of the bitmap among the plurality of third slots are assigned to the SL resource pool, and
wherein slots related to 0 of the bitmap among the plurality of third slots are excluded from the SL resource pool.

15. The first device of claim 14, wherein the one or more reserved slots are excluded from the plurality of second slots, based on a number of the plurality of second slots not being a multiple of a size of the bitmap.

16. The first device of claim 15, wherein a number of the plurality of third slots is a multiple of the size of the bitmap.

17. The first device of claim 16, wherein a minimum value of the size of the bitmap is 10.

18. The first device of claim 16, wherein a maximum value of the size of the bitmap is 160.

19. The first device of claim 14, wherein the one or more processors further execute the instructions to:
obtain a number of SL slots, based on the information related to the UL resource, reference subcarrier spacing (SCS) information related to the TDD UL-DL configuration, and SCS information related to a SL bandwidth part (BWP); and
transmit, to a second device, a physical sidelink broadcast channel (PSBCH) including information related to the number of the SL slots.

20. A processing device adapted to control a first device performing wireless communication, the processing device comprising:
one or more processors; and
one or more memories operably connected to the one or more processors and storing instructions, wherein the one or more processors execute the instructions to:
obtain a time division duplex uplink-downlink (TDD UL-DL) configuration including information related to an uplink (UL) resource;
obtain information related to a start of sidelink (SL) symbols, information related to a number of the SL symbols, and a bitmap representing one or more slots included in a SL resource pool;
determine a plurality of second slots by excluding (i) one or more slots in which at least one symbol among the SL symbols is not configured as the UL resource and (ii) one or more slots in which a sidelink-synchronization signal block (S-SSB) is configured from a plurality of first slots;
determine a plurality of third slots by excluding one or more reserved slots from the plurality of second slots; and
determine a plurality of fourth slots assigned to the SL resource pool among the plurality of third slots,
wherein the plurality of fourth slots related to 1 of the bitmap among the plurality of third slots are assigned to the SL resource pool, and
wherein slots related to 0 of the bitmap among the plurality of third slots are excluded from the SL resource pool.

* * * * *